United States Patent
Tiwari et al.

(10) Patent No.: US 10,477,426 B1
(45) Date of Patent: Nov. 12, 2019

(54) IDENTIFYING A CELL SITE AS A TARGET FOR UTILIZING 5TH GENERATION (5G) NETWORK TECHNOLOGIES AND UPGRADING THE CELL SITE TO IMPLEMENT THE 5G NETWORK TECHNOLOGIES

(71) Applicant: Accenture Global Solutions Limited, Dublin (IE)

(72) Inventors: Sanjay Tiwari, Bangalore (IN); Badarayan Panigrahi, Bangalore (IN); Mayur Kolhe, Bengaluru (IN); Binit Agrawal, Bangalore (IN); Mathangi Sandilya, Bangalore (IN); Surya Kumar Ivg, Chennai (IN); Indranil Choudhuri, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/268,869

(22) Filed: Feb. 6, 2019

(51) Int. Cl.
*H04L 1/00* (2006.01)
*H04W 24/02* (2009.01)
*H04W 24/10* (2009.01)
*H04L 12/26* (2006.01)
*H04W 16/18* (2009.01)

(52) U.S. Cl.
CPC .......... *H04W 24/10* (2013.01); *H04L 43/062* (2013.01); *H04L 43/16* (2013.01); *H04W 16/18* (2013.01)

(58) Field of Classification Search
None
See application file for complete search history.

(56) References Cited

U.S. PATENT DOCUMENTS

| | | | | |
|---|---|---|---|---|
| 8,560,670 | B2 * | 10/2013 | Stipanovich | ............ H04L 41/22 709/220 |
| 8,676,956 | B1 * | 3/2014 | Johnson | .............. H04L 43/0876 359/206.1 |
| 9,204,319 | B2 * | 12/2015 | Ouyang | ................. H04W 16/18 |
| 9,210,600 | B1 * | 12/2015 | Jadunandan | .......... H04W 24/08 |
| 9,282,007 | B2 * | 3/2016 | Effros | ................... H04L 41/145 |
| 9,769,207 | B2 * | 9/2017 | Raleigh | ............... H04L 12/1403 |
| 9,949,061 | B2 * | 4/2018 | Wu | ..................... H04L 41/0663 |
| 9,986,413 | B2 * | 5/2018 | Raleigh | ................... H04L 12/14 |
| 10,009,779 | B2 * | 6/2018 | Zhu | ....................... H04L 5/0057 |

(Continued)

*Primary Examiner* — Tuan A Tran
(74) *Attorney, Agent, or Firm* — Harrity & Harrity, LLP

(57) ABSTRACT

A device identifies a subset of network performance indicator (NPI) values that measure network performance during peak usage time periods, selects particular NPI values associated with the peak usage time periods, based on one or more of the subset of NPI values satisfying particular threshold network performance values, and compares the particular NPI values with threshold upper and lower bound network performance values to determine weighted scores for the particular NPI values. The device determines, by processing the weighted scores, a weighted mean score that represents a mean of the weighted scores, and determines, based on an analysis of the particular NPI values and the weighted mean score, an overall site score that represents a viability level in upgrading the cell site. The device generates, based on the overall site score, a plan to upgrade one or more network technologies associated with the cell site.

20 Claims, 10 Drawing Sheets

(56) References Cited

U.S. PATENT DOCUMENTS

| | | | |
|---|---|---|---|
| 2008/0152104 A1* | 6/2008 | Keeler | H04W 24/04 379/112.01 |
| 2014/0164622 A1* | 6/2014 | Afshin | H04L 41/082 709/226 |
| 2015/0195721 A1* | 7/2015 | Costelloe | H04W 8/24 455/425 |
| 2017/0150375 A1* | 5/2017 | Zhu | H04L 5/0057 |
| 2018/0067841 A1* | 3/2018 | Mahimkar | G06F 11/3668 |

* cited by examiner

| Example Network Performance Indicator (NPI) | Values |
|---|---|
| Total Data Volume (GB) | 7.78 |
| Total Traffic QCI = 1&2 (MB) | 28.55 |
| Downlink (DL) Cell Throughput (Mbps) | 17.00 |
| Uplink (UP) Cell Throughput (Mbps) | 1.04 |
| DL User Throughput (Mbps) | 3.09 |
| UL User Throughput (Mbps) | 0.4331 |
| DL PRB Utilization Rate | 94.50 |
| UL PRB Utilization Rate | 33.42 |
| Max No. of RRC Connections | 72 |
| Mean No. of RRC Connections | 49.3989 |
| Mean CQI | 6.39 |
| Mean DL MCS | 9.81 |
| Mean UL MCS | 10.81 |
| RRC Setup Success Rate | 99.90 |
| VoLTE Drop Call Rate | 0.00 |
| RRC Drop Rate (TDD) | 0.03 |
| Cell Availability | 100.00 |
| Max DL Active Users | 42 |
| Max UL Active Users | 40 |
| Mean DL Active User Number | 16.0641 |
| Mean UL Active User Number | 14.5631 |
| Mean DL Active User Number (QCI=9) | 11.0647 |
| Mean UL Active User Number (QCI=1) | 3.7954 |
| Mean DL Active User Number (QCI=1) | 3.5870 |
| Mean UL Active User Number (QCI=2) | 0.00 |
| VoLTE Handover Success Rate | 98.06 |

| Example Threshold Network Performance Values | |
|---|---|
| No. of RRC Connections | > 100 |
| Mean No. of RRC Connections | > 30 |
| DL Cell Throughput (Mbps) | > 25 |
| DL PRB Utilization Rate | > 70% |
| UP PRB Utilization Rate | > 60% |
| Mean CQI | > 12 |

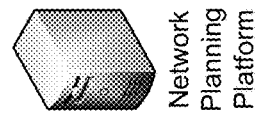

Network Planning Platform

105
Network performance indicator (NPI) values for group of cell sites

110
Threshold network performance values

IDENTIFYING A CELL SITE AS A TARGET FOR UTILIZING 5TH GENERATION (5G) NETWORK TECHNOLOGIES AND UPGRADING THE CELL SITE TO IMPLEMENT THE 5G NETWORK TECHNOLOGIES

BACKGROUND

A cell site is a cellular-enabled mobile device site where antennas or electronic communications equipment are placed to create a cell (or adjacent cells) in a cellular network. Many telecommunication networks include third generation (3G) cell sites and/or fourth generation (4G) cell sites. In some cases, a 3G cell site or a 4G cell site may be upgraded to a fifth generation (5G) cell site. In other cases, a new 5G cell site may be added as part of the cellular network.

SUMMARY

According to some implementations, a method may include receiving, by a device, a set of network performance indicator (NPI) values for network performance metrics that measure network performance of a cell site at specific time periods. The method may include identifying, by the device, a subset of NPI values, of the set of NPI values, that measure network performance during peak usage time periods, and determining, by the device, whether each NPI value of the subset of NPI values satisfies a threshold network performance value of a set of threshold network performance values. The method may include selecting, by the device, particular NPI values, of the set of NPI values, that are associated with the peak usage time periods, based on one or more of the subset of NPI values satisfying particular threshold network performance values of the set of threshold network performance values, and comparing, by the device, the particular NPI values with a set of upper bound network performance values and a set of lower bound network performance values. The method may include determining, by the device, a set of weighted scores for the particular NPI values based on comparing the particular NPI values with the set of upper bound network performance values and the set of lower bound network performance values; determining, by the device and by processing the set of weighted scores, a weighted mean score that represents a mean of the set of weighted scores for the particular NPI values; and determining, by the device and based on an analysis of the particular NPI values and the weighted mean score, an overall site score that represents a viability level in upgrading the cell site. The method may include performing, by the device, one or more actions based on the overall site score.

According to some implementations, a device may include one or more memories, and one or more processors, communicatively coupled to the one or more memories, to receive a set of NPI values for network performance metrics that measure network performance of a cell site at specific time periods. The one or more processors may identify a subset of NPI values, of the set of NPI values, that measure network performance during peak usage time periods, and determine that one or more NPI values, of the subset of NPI values, satisfy particular threshold network performance values, of a set of threshold network performance values that represent standards of network performance. The one or more processors may select particular NPI values, of the set of NPI values, that are associated with the peak usage time periods, based on the one or more NPI values satisfying the particular threshold network performance values of the set of threshold network performance values, and compare each NPI value, of the particular NPI values with a set of upper bound network performance values and a set of lower bound network performance values. The one or more processors may determine a set of weighted scores for the particular NPI values based on comparing the particular NPI values with the set of upper bound network performance values and the set of lower bound network performance values; determine, by processing the set of weighted scores, a weighted mean score that represents a mean of the set of weighted scores for the particular NPI values; and determine, based on an analysis of the particular NPI values and the weighted mean score, an overall site score that represents a viability level in upgrading the cell site. The one or more processors may generate, based on an analysis of the overall site score and one or more additional overall site scores for one or more other cell sites, a plan to upgrade at least one of: one or more network technologies associated with the cell site, or one or more network technologies associated with the one or more other cell sites. The one or more processors may perform one or more actions to cause the plan to be implemented.

According to some implementations, a non-transitory computer-readable medium may store one or more instructions that, when executed by one or more processors of a device, cause the one or more processors to receive a set of NPI values for network performance metrics that measure network performance of a cell site at specific time periods throughout an interval of time. The one or more instructions may cause the one or more processors to receive a set of threshold network performance values that represent standards of network performance, process the set of NPI values to identify a subset of NPI values that measure network performance during peak usage time periods, and cause the one or more processors to determine that one or more NPI values, of the subset of NPI values, satisfies particular threshold network performance values of the set of threshold network performance values. The one or more instructions may cause the one or more processors to select particular NPI values, of the set of NPI values, that are associated with the peak usage time periods, based on the one or more NPI values satisfying the particular threshold network performance values of the set of threshold network performance values, and compare the particular NPI values with a set of upper bound network performance values and a set of lower bound network performance values. The one or more instructions may cause the one or more processors to determine a set of weighted scores for the particular NPI values based on comparing the particular NPI values with the set of upper bound network performance values and the set of lower bound network performance values; determine, by processing the set of weighted scores, a weighted mean score that represents a mean of the set of weighted scores for the particular NPI values; determine, based on an analysis of the particular NPI values and the weighted mean score, an overall site score that represents a viability level in upgrading the cell site; and generate, based on the overall site score, a plan to upgrade one or more network technologies associated with the cell site. The one or more instructions may cause the one or more processors to determine, based on whether the overall site score satisfies a threshold confidence level, whether to automatically implement the plan or to obtain approval to implement the plan, and perform a first group of one or more actions or a second group of one or more actions based on determining whether to automatically implement the plan or to obtain approval to implement the plan.

BRIEF DESCRIPTION OF THE DRAWINGS

FIGS. 1A-1E are diagrams of one or more example implementations described herein.

DETAILED DESCRIPTION

Figure 1B:
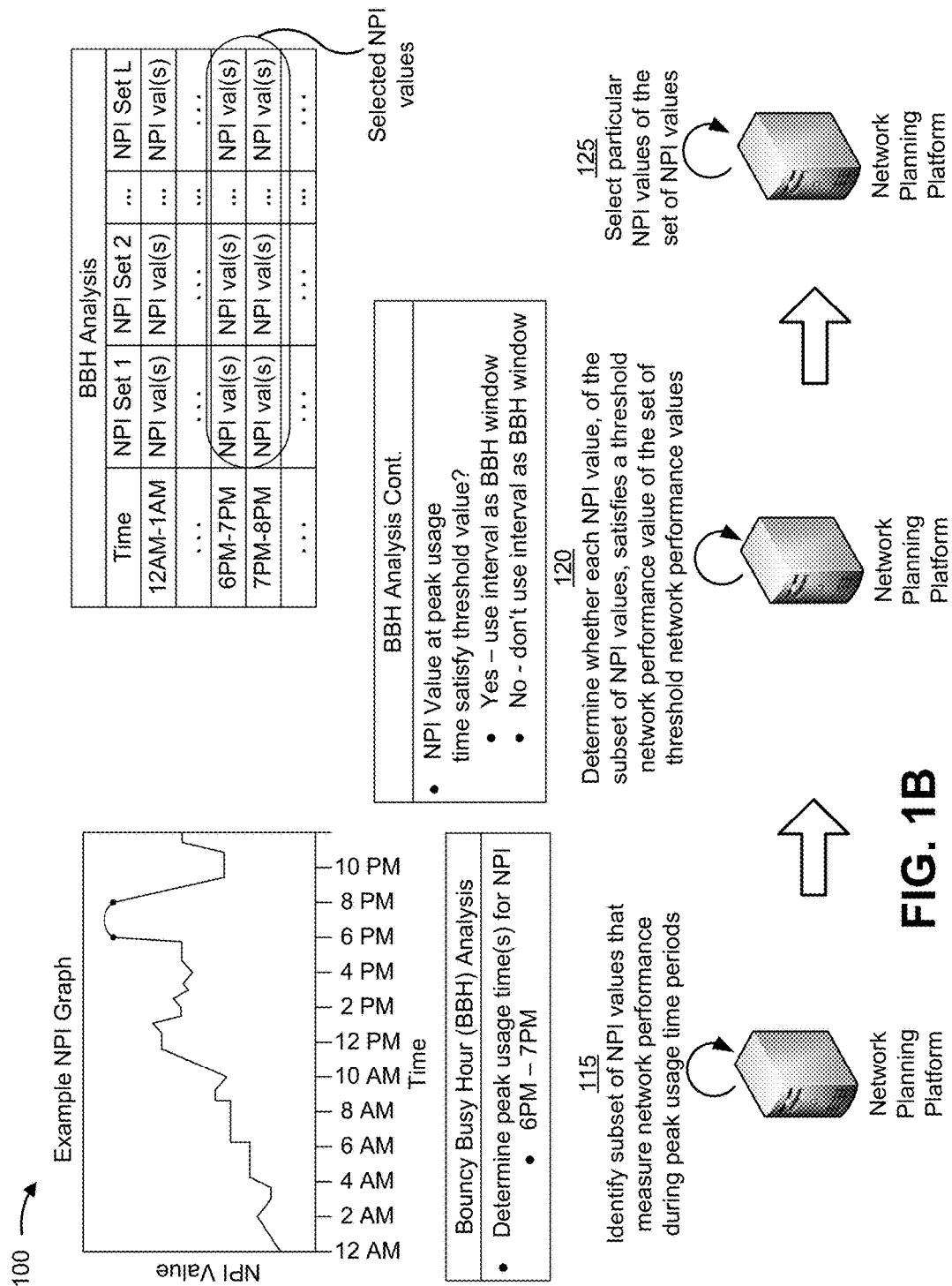

The following detailed description of example implementations refers to the accompanying drawings. The same reference numbers in different drawings may identify the same or similar elements.

A telecommunication provider may support a cellular network for a geographic region. The cellular network may be defined by a set of cells that are supported by cell sites. In many cases, the cell sites may support network services using third generation (3G) network technology and/or fourth generation (4G) network technology.

As the number of users with mobile devices and/or internet-accessible devices continues to increase, the amount of traffic that needs to be supported by the cell sites will increase. This causes high latency rates at the cell sites, decreases available bandwidth and throughput of traffic at the cell sites, and/or the like. Furthermore, architectural constraints associated with 3G or 4G network technologies do not allow for efficient resource allocation at the cell sites. For example, a user device that is streaming a movie may have access to a similar amount of resources as an internet of things (IoT) device that has significantly lower data usage needs. Moreover, without clear insight into customer data and metrics that influence network performance, the telecommunication provider may be unable to optimize return on investments (ROIs) associated with the cell sites.

One solution is to upgrade network technology at the cell sites from 3G or 4G network technologies to fifth generation (5G) network technologies. However, upgrading thousands, tens of thousands, or more, cell sites to support 5G technologies is a time consuming, expensive task. Furthermore, without a means for accurately prioritizing upgrades of the cell sites, certain cell sites will continue to experience high latency rates, decreases in available bandwidth and throughput, be constrained to inefficient allocation of resources, and/or the like.

Some implementations described herein provide a network planning platform to determine an overall site score for a cell site, to generate a plan to upgrade the cell site, and to perform one or more actions to cause the plan to be implemented. For example, the network planning platform may receive a set of network performance indicator (NPI) values for network performance metrics that measure network performance of a cell site at specific time periods. In this case, the network planning platform may identify NPI values that measure network performance during peak usage time periods and may determine whether the NPI values satisfy threshold network performance values that represent industry standards of network performance.

Additionally, the network planning platform may select a subset of the peak usage time periods that are associated with a subset of the NPI values that satisfied particular threshold network performance values. In this case, the network planning platform may identify NPI values that are measured during the selected subset of peak usage time periods (referred to hereafter as particular NPI values). Furthermore, the network planning platform may determine a set of weighted scores for the particular NPI values by comparing the particular NPI values with one or more of a set of upper bound network performance values and a set of lower bound network performance values. Additionally, the network planning platform may determine a weighted mean score that represents a mean of the set of weighted scores. This may allow the network planning platform to determine, based on an analysis of the particular NPI values and the weighted mean score, an overall site score that represents a viability level in upgrading the cell site. Moreover, the network planning platform may, based on the overall site score, generate a plan to upgrade the cell site and perform one or more actions to cause the plan to be implemented.

In this way, the network planning platform generates an overall site score that is used to determine whether to upgrade the cell site. By upgrading the cell site (e.g., to a cell site that supports 5G network technologies), and/or causing the site to be upgraded, the network planning platform improves overall service in the coverage area, thereby reducing latency rates, increasing available bandwidth and throughput, improving quality of service, all while allowing for a more efficient and effective allocation of resources. Additionally, the network planning platform conserves resources (e.g., processing resources, network resources, memory resources, and/or the like) that would otherwise be expended supporting calls and data services with insufficient resources, which would lead to dropped calls, slow data connections, and/or the like.

In some cases, the network planning platform may generate a set of overall site scores for a group of cell sites, may generate a plan to upgrade the group of cell sites (which may specify an order in which to upgrade each cell site, each hardware component and/or software element of a cell site, etc.), and may perform one or more actions to cause the group of cell sites to be efficiently upgraded. By efficiently and effectively upgrading the group of cell sites (e.g., based on each cell site's need for an upgrade relative to other cell sites, based on a budget of a telecommunication provider, and/or the like), the network planning platform conserves resources that would otherwise be wasted by inefficient processing at each cell site. For example, without upgrading each cell site in an optimal order, the network planning platform might waste resources upgrading a cell site that did not need to be immediately upgraded, while another cell site that did need to be upgraded would continue to experience high latency, low bandwidth and throughput, low quality of service, dropped calls, packet loss, and/or the like.

FIGS. 1A-1E are diagrams of one or more example implementations 100 described herein. Example implementation(s) 100 may include a network planning platform, a data storage device, a client device, and a cell site. As shown in FIGS. 1A-1E, a network planning platform may determine an overall site score for the cell site, may generate a plan to upgrade the cell site to support fifth generation (5G) network technologies, and may perform one or more actions that cause the plan to be implemented.

As shown in FIG. 1A, the network planning platform may receive data that may be used for generating the overall site score for the cell site. While one or more implementations described herein may refer to a single overall site score used as part of a plan to upgrade a single cell site, it is to be understood that this is provided by way of example. As will be discussed further herein, the network planning platform may, in some cases, determine a set of overall site scores for a group of cell sites, and may generate a plan that indicates an order in which to upgrade the group of cell sites.

As shown by reference number 105, the network planning platform may receive a set of network performance indicator (NPI) values for network performance metrics that measure network performance of the cell site at specific time periods. For example, the network planning platform may receive the set of NPI values from the data storage device. The data storage device may be associated with a telecommunication provider and may store the set of NPI values for the cell site, for one or more nearby cell sites, for all (or some) of the cell sites operated by the telecommunication provider, and/or the like.

The set of NPI values may include one or more values that measure volume of traffic, one or more utilization rate values associated with the cell site, one or more quality of service (QoS) values associated with the cell site, one or more throughput values associated with the cell site, one or more values that measure user activity, and/or the like. The one or more values that measure volume of traffic may include a total data volume value, a total traffic quality of service class identifier (QCI) value, and/or the like. The one or more utilization rate values may include a downlink physical resource block (PRB) utilization rate, an uplink PRB utilization rate, and/or the like.

Additionally, the one or more QoS values may include an average channel quality indicator (CQI) value, an average downlink modulation coding scheme (MCS) value, an average uplink MCS value, a radio resource control (RRC) setup success rate value, a voice over long term evolution (VoLTE) dropped call rate value, an RRC drop rate value, a handover success rate value, such as a VoLTE handover success rate, and/or the like. The one or more throughput values may include a downlink cell throughput value, an uplink cell throughput value, a downlink user throughput value, an uplink user throughput value, and/or the like. The one or more metrics that measure user activity may include a value indicating a maximum number of RRC connections, a value indicating a mean number of RRC connections, a value indicating a maximum number of active downlink users, a value indicating a maximum number of uplink users, a value indicating a mean number of uplink users given a particular QCI value, and/or the like.

It is to be understood that these metrics are provided by way of example. In practice, any number of other metrics may be collected by the communication provider and provided to the network planning platform. For example, the data storage device might store one or more latency values that measure delay of signals and/or packets being received by and/or transmitted by cell sites.

In some implementations, the set of NPI values may be provided to the network planning platform as part of a request made by the client device. For example, a user may interact with the client device to access an interface for a website or application that includes one or more network planning services. The one or more network planning services may include a service that allows the user to request that the network planning platform generate a plan to upgrade network technologies at a cell site, at a group of cell sites, and/or the like. In this case, the user may interact with the interface to submit a request to generate a plan for the group of cell sites, which may cause the request to be provided to the network planning platform.

In some implementations, the network planning platform may, based on receiving the request from the client device, obtain the set of NPI values from the data storage device. In some implementations, the data storage device may be configured to provide the network planning platform with the set of NPI values (e.g., based on the client device submitting the request, periodically over an interval, and/or the like).

As shown by reference number 110, the network planning platform may receive a set of threshold network performance values. For example, the network planning platform may receive the set of threshold network performance values from the data storage device or from another data storage device. In this case, the set of threshold network performance values may be provided to the network planning platform in the same or similar manner as described above (e.g., based on the request provided by the client device, etc.). The set of threshold network performance values may represent standards of network performance, such as industry standards, standards set by the telecommunication provider, and/or the like. The set of threshold network performance values may correspond to the set of NPI values of a subset of the set of NPI values described above.

In this way, the network planning platform receives a set of NPI values and a set of threshold network performance values for further processing.

As shown in FIG. 1B, and by reference number 115, the network planning platform may identify a subset of NPI values, of the set of NPI values, that measure network performance during peak usage time periods. For example, the set of NPI values may include values that were measured for a set of time periods (e.g., every hour of a day, every day of a month, and/or the like). In this case, the network planning platform may, for each type of network performance metric and for each day of a given interval (e.g., each day within a six-month interval), identify a peak usage time period for each day, for each type of network performance metric. A peak usage time period may include a time period where an NPI value represents a maximum amount of resources used within a given interval (relative to other time periods in the interval), a busiest time period within the given interval (e.g., a time period where a maximum number of users are connected to the cellular network, a time period where a highest amount of traffic is being provided through the cellular network, and/or the like), and/or the like.

To provide a specific example, an interval may be a 24-hour day, and NPI values for twenty-six network performance metrics may have been measured for each hour within the 24-hour day. In this example, the network planning platform may, for each type of network performance metric (e.g., for each set of twenty four values), identify a one-hour peak usage time period that is associated with an NPI value that represents a maximum amount of resources used that day, a one-hour peak usage time period that represents a busiest time period in the day, and/or the like. This means that the network planning platform may identify one peak-usage time period per day per type of network performance metric, although in many cases these peak usage time periods may overlap with each other. For example, if there are twenty-six types of network performance metrics, and ten types of network performance metrics share a first peak usage time period, while the other sixteen share a second peak usage time period, then there would only be two peak usage time periods. Furthermore, the peak usage time periods may, for a particular type of network performance metric, be different for different days in an interval. For example, a first type of network performance metric may have a peak usage time period of 6:00 PM to 7:00 PM for a first day but may have a peak usage time period of 7:00 PM to 8:00 PM for a second day.

As shown by reference number 120, the network planning platform may determine whether each NPI value, of the subset of NPI values, satisfies a threshold network performance value of the set of threshold network performance values. For example, in some cases, a particular type of network performance metric may have NPI values that represent low data usages (i.e., a time period that is not busy). In these cases, an NPI value that is identified during a peak usage time period might actually be associated with a low data usage or less busy time period. To address this, the network planning platform may determine whether the NPI value satisfies a corresponding threshold network performance value (e.g., that represents an industry norm for a specific network performance metric).

As an example, the network planning platform may identify a first NPI value as being part of a first peak usage time period. In this example, the network planning platform may compare the first NPI value and a threshold network performance value. If the first NPI value satisfies the threshold network performance value, then the network planning platform may effectively conclude that the first peak usage time period is actually a high usage period or busy period. Conversely, if the first NPI value does not satisfy the threshold network performance value, then the network planning platform may effectively conclude that the first peak usage time period is not actually a high usage period or busy period.

As shown by reference number 125, the network planning platform may select particular NPI values of the set of NPI values. For example, the network planning platform may select a group of NPI values, of the subset of NPI values, based on the particular NPI values satisfying particular threshold network performance values. The group of NPI values may be associated with particular peak usage time periods, of the peak usage time periods described above. Additionally, the network planning platform may select another group of NPI values, of the set of NPI values, that are associated with the particular peak usage time periods (e.g., including NPI values that were not initially identified as being part of the subset of NPI values). The group of NPI values and the other group of NPI values may be collectively referred to hereafter as particular NPI values.

In this way, the network planning platform may select particular NPI values, that are associated with particular peak usage time periods, for further processing.

Figure 1C:
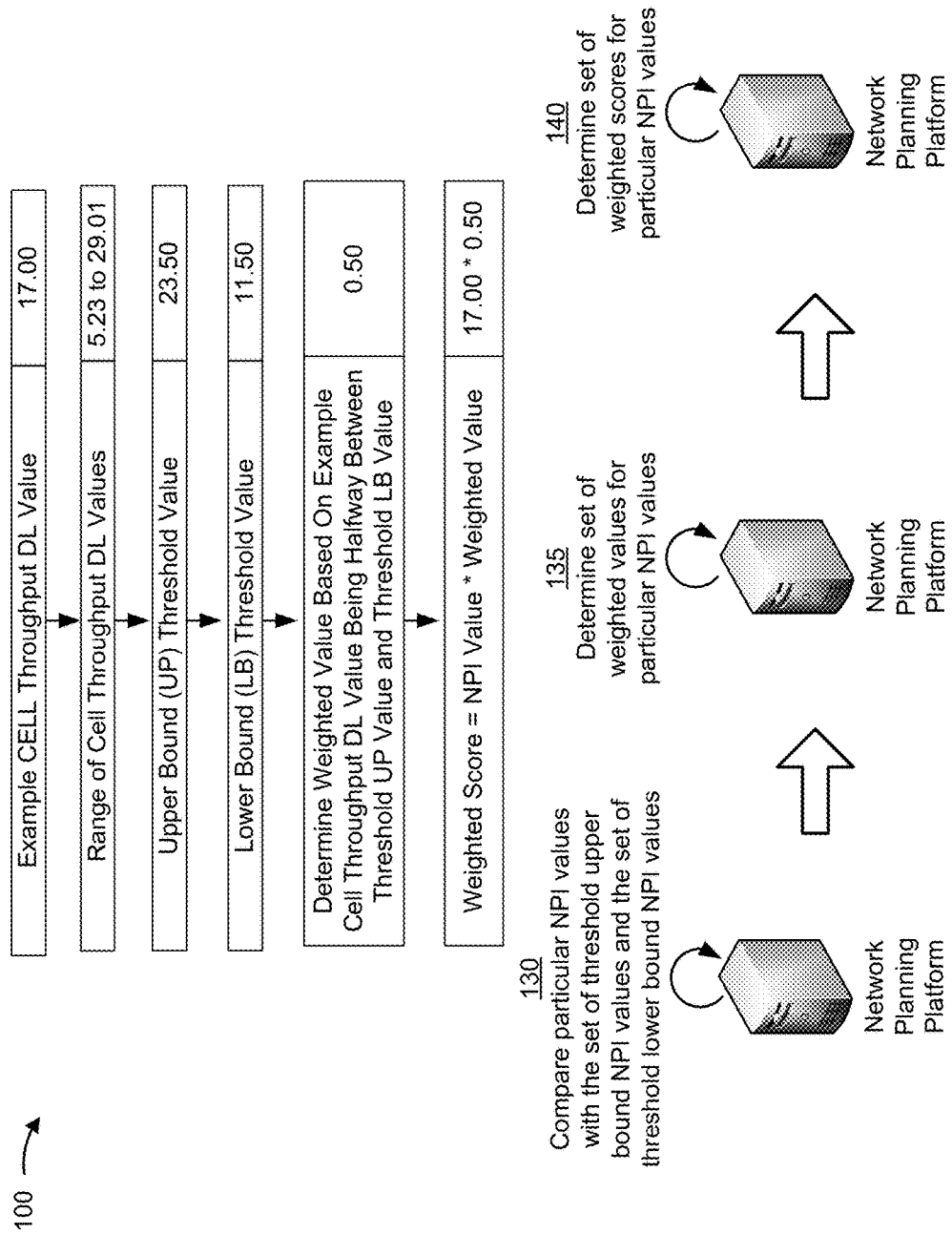

As shown in FIG. 1C, and by reference number 130, the network planning platform may compare the particular NPI values with a set of upper bound NPI values and a set of lower bound NPI values. For example, the network planning platform may compare each NPI value, of the particular NPI values, with a particular upper bound NPI value, of the set of upper bound NPI values, and with a corresponding particular lower bound NPI value of the set of lower bound NPI values.

In some implementations, the set of upper bound NP values and the set of lower bound NPI values may identify a middle portion of a distribution of the set of NPI values. For example, a upper bound NPI value may serve as an outer-quartile range of a distribution of NPI values and a lower bound NPI value may serve as an inner-quartile range of the distribution of NPI values. This may allow the network planning platform to assign a weighted value to each NPI value, which may assist the network planning platform in determining an overall site score for the cell site, as described further herein. In some implementations, a upper bound NPI value and a lower bound NPI value may be used for each type of network performance metric. Using the example shown in FIG. 1A, which depicts twenty-six network performance metrics, twenty-six sets of upper bound NPI values and lower bound NPI values may be used for further processing.

In some implementations, the network planning platform may determine the set of upper bound NPI values and the set of lower bound NPI values. For example, the network planning platform may analyze each NPI value, associated with a particular network performance metric, to determine a upper bound NPI value and a corresponding lower bound NPI value. In some cases, the network planning platform may determine that the upper bound NPI value is a value representing an outer-quartile range for the NPI values associated with the particular network performance metric (e.g., a value associated with a $75^{th}$ percentile) and may determine that the lower bound NPI value is a value representing a lower-quartile range for the NPI values (e.g., a value associated with a $25^{th}$ percentile). It is to be understood that the outer-quartile range and the inner-quartile range are provided by way of example. In practice, the set of upper bound NPI values and the set of lower bound NPI values may be configured to a number of different values, distribution percentages, and/or the like.

In some implementations, the network planning platform may receive the set of upper bound NPI values and the set of lower bound NPI values. For example, the network planning platform may receive the set of upper bound NPI values and the set of lower bound NPI values from the data storage device that stores the set of NPI values (e.g., based on receiving the request from the client device, periodically over an interval, based on a similar type of trigger, and/or the like).

As shown by reference number 135, the network planning platform may determine a set of weighted values for the particular NPI values. For example, the network planning platform may determine a set of weighted values based on comparing the particular NPI values with the set of upper bound NPI values and the set of lower bound NPI values.

In some implementations, the network planning platform may determine a weighted value for an NPI value based on the NPI value not being between a upper bound NPI value and a lower bound NPI value. For example, the network planning platform may, as described above, compare the NPI value with the upper bound NPI value and the lower bound NPI value to determine whether the NPI value is between the two threshold values. If the NPI value is greater than the upper bound NPI value, the network planning platform may assign the NPI value a weighted value of one. If the NPI value is lower than the lower bound NPI value, the network planning platform may assign the NPI value a weighted value of zero. In other cases, a different weighting scale may be used (e.g., values between zero and one hundred, etc.).

In some implementations, the network planning platform may determine a weighted value for an NPI value based on a degree to which the NPI value is between a upper bound NPI value and a corresponding lower bound NPI value. For example, the network planning platform may, as described above, compare the NPI value with the upper bound NPI value and the lower bound NPI value to determine whether the NPI value is between the two threshold values. If the NPI value is between the two threshold values, the network planning platform may determine a first distance (e.g., in values, etc.) between the NPI value and the upper bound NPI value, may determine a second distance between the NPI value and the lower bound NPI value, and may determine a weighted value based on the first distance and the second distance.

As an example, if an NPI value is 80, a upper bound NPI value is 120, and a lower bound NPI value is 40, the network planning platform may determine that the weighted value is 0.5, based on the NPI value being 40 values away from the lower bound NPI value and 40 values away from the upper bound NPI value. As another example, if an NPI value is 90, a upper bound NPI value is 120, and a lower bound NPI value is 40, the network planning platform may determine that the weighted value is 0.375 (e.g., based on the NPI value being a closer value to the lower bound NPI value than the upper bound NPI value).

As shown by reference number 140, the network planning platform may determine a set of weighted scores for the particular NPI values. For example, the network planning platform may determine a weighted score for each NPI value, of the particular NPI values, by multiplying each NPI value against a weighted value of the set of weighted values. As an example, the network planning platform may determine a weighted score for a NPI value. In this example, the network planning platform may multiply a weighted value (e.g., which may be associated with a particular type of network performance metric) against the NPI value to determine the weighted score. In some cases, rather than determine the set of weighted scores, the network planning platform may simply provide the set of weighted values, along with other data described herein, as input to an overall site score equation or a data model that may be used to determine the overall site score (i.e., such that determining the set of weighted scores may be processing performed by the overall site score equation or the data model).

In this way, the network planning platform is able to determine a set of weighted scores for the particular NPIs, which may be further processed to determine an overall site score for the cell site, as described below.

Figure 1D:
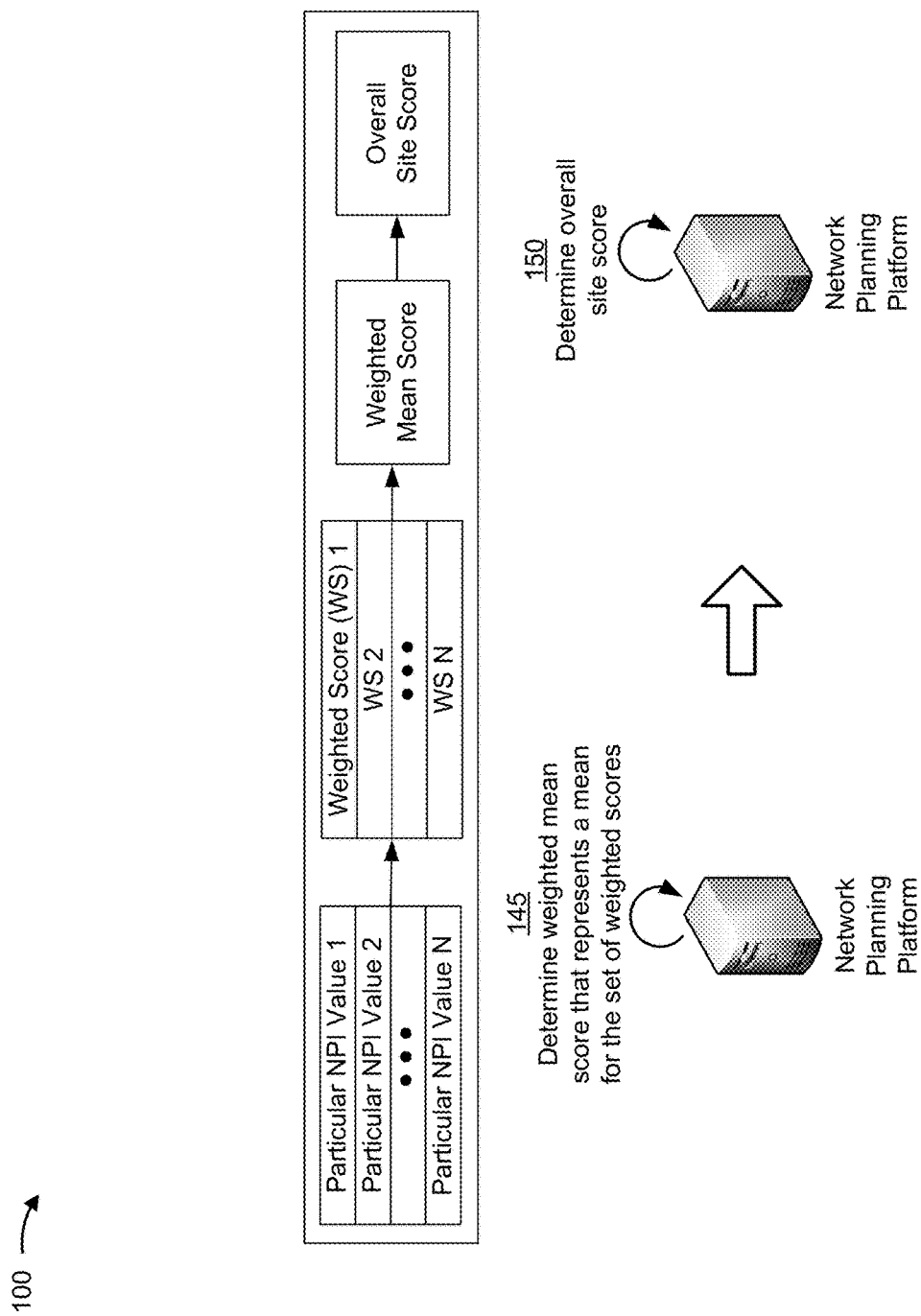

As shown in FIG. 1D, and by reference number 145, the network planning platform may determine a weighted mean score that represents a mean of the set of weighted scores. For example, the network planning platform may determine a weighted mean score by adding together each weighted score, of the set of weighted scores, and dividing by a total number of weighted scores. As another example, the network planning platform may determine a weighted mean score using an equation that considers the set of weighted values (as opposed to the set of weighted scores) and the particular NPI values. As a specific example, if there are three particular NPI values and a set of weighted values that include a first weighted value of 0.3, a second weighted value of 0.2, and a third weighted value of 0.5, then the network planning platform may use a weighted mean equation to multiply a first particular NPI value against the first weighted value, multiply a second particular NPI value against the second weighted value, multiply a third particular NPI value against the third weighted value, and divide by a total number of weighted values (i.e., three).

As shown by reference number 150, the network planning platform may determine an overall site score for the cell site. For example, the network planning platform may determine an overall site score that represents a viability level in upgrading the cell site. In some cases, the overall site score may have a value between zero and one (or a value between any two numbers), where the value of zero represents that the cell site does not need to be upgraded and the value of one represents that the cell site does need to be upgraded.

In some implementations, the network planning platform may determine the overall site score using additional information. For example, the network planning platform may receive data that identifies a list of site equipment for the cell site. In this case, the network planning platform may process the data to determine a predicted cost of upgrading the cell site. In this way, the network planning platform may consider the predicted cost of upgrading the cell site (e.g., along with the set of NPI values, the particular NPI values, the weighted mean score, and/or the like) when determining the overall site score.

In some implementations, the network planning platform may determine the overall site score using a data model. For example, the network planning platform may have trained the data model to generate site scores based on a machine-learning-driven analysis of NPI values, weighted values, weighted scores, mean scores, data that identifies predicted costs of upgrading other cell sites, and/or the like. The data model may have been trained using one or more one or more machine learning techniques, such as a technique using a neural network, an anomaly detection technique, a technique using decision trees, and/or the like. In some implementations, the network planning platform may have received a trained data model (rather than training the data model locally).

Additionally, the network planning platform may use the data model to determine the overall site score. For example, the network planning platform may provide, as input to the data model: the set of NPI values, the subset of NPI values, the particular NPI values, the threshold set of upper bound NPI values, the threshold set of lower bound NPI values, the set of weighted values, the set of weighted scores, the weighted mean score, data that identifies a list of equipment at the cell site, data that identifies a predicted cost of upgrading the cell site, and/or the like (collectively referred to as input data). In this case, the data model may output the overall site score and/or one or more values that may be used to determine the overall site scores.

Additionally, or alternatively, the network planning platform may determine the overall site score using a predictive data model. For example, the network planning platform may train a predictive data model (or may receive a trained predictive data model) to determine the overall site score based on a predicted set of NPI values (rather than based on actual NPI values). In this case, the network planning platform may provide the input data to the predictive data model to cause the predictive data model to generate a predicted set of NPI values for the cell site for a future time period.

Additionally, the network planning platform may generate a new set of weighted scores for the predicted set of NPI values and may generate a new weighted mean score that represents a mean of the new set of weighted scores. Furthermore, the network planning platform may determine the overall site score based on an analysis of the predicted set of NPI values, the new weighted mean score, and/or the like. In some implementations, the network planning platform may determine the overall site score based on an analysis that takes into account both the set of NPI values and the predicted set of NPI values.

In some implementations, the network planning platform may perform one or more actions based on the overall site score. For example, the network planning platform may perform one or more actions that cause an upgrade to be performed at the cell site, such as action(s) described further herein.

While FIGS. 1B-1D illustrate the network planning platform determining an overall site score for the cell site, it is to be understood that this is provided by way of example. In practice, the network planning platform may use one or more techniques described herein to determine overall site scores for a group of cell sites.

In this way, the network planning platform is able to determine the overall site score for the cell site (and/or overall site scores for one or more additional cell sites), which may be used to determine whether to upgrade the cell site (and/or the one or more additional cell sites).

Figure 1E:
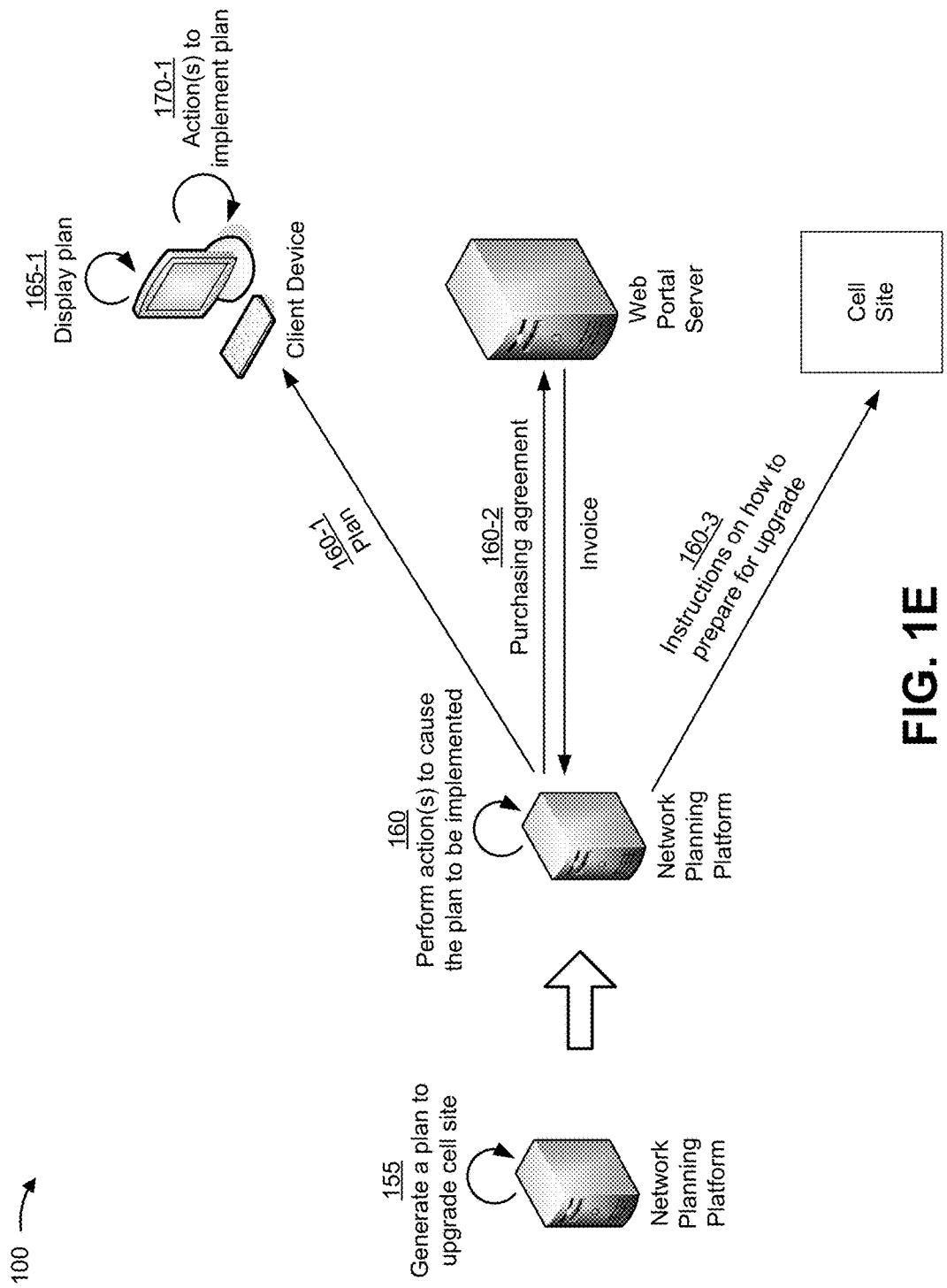

As shown in FIG. 1E, and by reference number 155, the network planning platform may generate a plan to upgrade one or more network technologies of the cell site. For example, the network planning platform may generate a plan to upgrade one or more network technologies of the cell site based on determining that the overall site score satisfies a threshold confidence level. In this case, the network planning platform may compare the overall site score to the threshold confidence level (e.g., if the overall site score is between 0 and 1, the threshold confidence level may be set to 0.7) and may generate the plan based on determining that the overall site score satisfies the threshold confidence level (e.g., based on the overall site score being at least 0.7).

The plan may indicate which network technologies are to be upgraded, may indicate one or more times at which to upgrade the specified network technologies, may indicate how to upgrade the cell site, and/or the like. For example, the plan may specify network technologies that are to be upgraded by including a list of hardware components that are to be updated, replaced, or removed, a list of software elements that are to be updated, replaced, or removed, and/or the like. As another example, the plan may indicate how to upgrade the cell site by indicating one or more merchant suppliers that sell the hardware components and/or the software elements, by indicating a present budget of the telecommunication organization along with a cost or a predicted cost to purchase the hardware components and/or the software elements, and/or the like.

In some implementations, the network planning platform may generate a plan that indicates which network technologies are to be upgraded. For example, the network planning platform may determine a confidence level associated with the overall site score and may be configured to select particular network technologies for the upgrade based on the confidence level associated with the overall site score. Additionally, or alternatively, the network planning platform may analyze each NPI value, each weighted score, each mean score, and/or the like, and may select specific network technologies as targets for the upgrade based on the analysis. In this case, the network planning platform may be configured with a set of rules that associate particular NPI values with particular decisions regarding which hardware equipment and/or software elements to select for the upgrade.

In some implementations, the network planning platform may generate a plan that indicates how to upgrade the cell site to support new network technologies. For example, the network planning platform may generate a set of instructions that indicate how to upgrade the cell site. In this case, the network planning platform may identify one or more websites associated with merchant suppliers that are selling the new network technologies and may scan the one or more websites to identify purchasing prices associated with the new network technologies. Additionally, the network planning platform may include, in the set of instructions, uniform resource locators (URLs) for the one or more websites, the purchasing prices associated with the new network technologies, and/or the like.

In some implementations, the cell site may support 3G network technologies and/or 4G network technologies, and the network planning platform may generate a plan to upgrade the cell site to support 5G network technologies. In this case, the network planning platform may generate a plan to replace one or more new antennas for the cell site (e.g., which may be needed to implement massive multiple-input multiple-output (MIMO), to upgrade a backhaul connection from the cell site to one or more other portions of the cellular network, to replace one or more microcells with a set of ultra-dense small cells, and/or any other upgrade that may be necessary to completely or partially upgrade the cell site to support 5G network technology.

In some implementations, the network planning platform may generate a plan that indicates an order in which to upgrade network technologies at a group of cell sites. For example, the network planning platform may generate a plan that indicates an order in which to upgrade each cell site, of the group of cell sites, a plan that indicates an order in which to upgrade particular hardware components and/or software elements at each cell site, of the group of cell sites, and/or the like.

In some implementations, the network planning platform may determine one or more additional metrics that may be used in generating the plan (e.g., a plan that indicates the order in which to upgrade the group of cell sites). For example, the network planning platform may receive new NPI values, such as a frequency value, a power value, one or more antenna gain values, a radio sensitivity value, one or more cable loss values, a low noise amplifier (LNA) value, one or more system loss values, and/or the like. In this case, the network planning platform may analyze the new NPI values to determine a maximum allowed path loss (MAPL). For example, the network planning platform may determine the MAPL by executing the following MAPL function: MAPL=[(transmitter power value)−(transmitter cable loss value)+(transmitter antenna gain value)+(receiver antenna gain value)−(receiver cable loss value)−(NLA value)−(receives radio sensitivity value)−(the one or more system loss values)].

Additionally, or alternatively, the network planning platform may analyze the new NPI values to determine a maximum range (i.e., free space) value. For example, the network planning platform may execute the following maximum range function: maximum range=[power (10, (MAPL−(32.44+20*(log 10(frequency value))))/20)]. Additionally, or alternatively, the network planning platform may analyze the new NPI values to determine an Azimuth value (e.g., an angle, measured in degrees, at which one or more antennas may be configured).

Additionally, or alternatively, the network planning platform may generate a plan based on an analysis of financial data associated with the telecommunication provider and/or equipment data that indicates existing hardware components and/or software elements installed at particular cell sites. For example, the network planning platform may simulate capital expenditures for the telecommunication provider, operational expenses for the telecommunication provider, and returns on investments (ROIs) for the telecommunication provider. In this case, the network planning platform may consider the capital expenditures, the operational expenses, and/or the ROIs, when generating the plan.

In some implementations, the network planning platform may receive financial data associated with the telecommunication provider. The financial data may include data that identifies an adjustable-rate preferred stock (ARPS), data that identifies a current operating income (COI), data that identifies one or more operational expenses, data that identifies an ROI for one or more investments, data that identifies an overhead cost (e.g., for each type of hardware equipment being rented, each software license that has been purchased, etc.), and/or the like. The list of existing hardware components and/or software elements may include currently deployed radio equipment, currently deployed antennas (e.g., a radio frequency (RF) antenna, etc.), current software deployed at a cell site, cables connecting one or more network components or elements (e.g., a jumper cable between a jumper and a base band), and/or the like.

In some implementations, the network planning platform may analyze the financial data to determine an overall capital expenditure. For example, the network planning platform may analyze the financial data to identify a set of expenses and may aggregate the set of expenses to determine the overall capital expenditure value.

Additionally, or alternatively, the network planning platform may analyze the financial data to determine an overall operational expense. For example, the network planning platform may analyze the financial data to identify a set of operational expenses (e.g., equipment rental, equipment maintenance, and/or the like) and may aggregate the set of operational expenses to determine the overall operational expense.

Additionally, or alternatively, the network planning platform may analyze the financial data to determine an ROI percentage. For example, the network planning platform may execute the following ROI function: ROI %=[((CARPS−overall operational expense)−overall capital expenditure)/overall capital expenditure)*100].

In some implementations, the network planning platform may generate a plan based on an analysis of user device mobility within a coverage area associated with the cell site or the group of cell sites. For example, the network planning platform may receive site information for one or more cell sites, geolocation data that identifies a geolocation of a set of user devices that are accessing network services, one or more traffic NPIs, visitor location register (VLR) data, call detail record data, and/or the like. In this case, the network planning platform may analyze one or more types of data described above to determine a time-based payload distribution of a cell site, a time-based user distribution of the cell site, one or more user statistics associated with the cell site, and/or the like. These distributions and statistics may allow the network planning platform to identify data usage trends that, when analyzed, may allow the network planning platform to dynamically allocate resources to specific devices at particular time periods. For example, if a cell site has a particular peak busy time period, the network planning platform may determine that a geo-location or geographic area is associated with high congestion and may cause the resources to be allocated to devices within the geo-location or the geographic area. In some cases, a device with the geo-location or the geographic area may be associated with a VIP customer, and the VIP customer may be allocated additional resources based on being within the geo-location or the geographic area.

In some implementations, the network planning platform may generate a plan that includes a recommendation for small cell deployment of one or more small cell sites, a recommendation to allocate resources to a small cell site (e.g., to a particular geographic location within a coverage area, at a particular time period, etc.), and/or the like. For example, in some situations, existing cell sites may not be able to support predicted load requirements for a particular service area. To identify optimal locations for one or more small cell sites that may be used in addition to, and/or in place of, particular cell sites, the network planning platform may receive and/or determine NPI values for the existing cell sites, data identifying a set of candidate locations for small cells, geo-location data for existing cell sites, data that identifies a set of competitor cell sites within the coverage area (e.g., a macro cell site, a small cell site, and/or the like), and/or the like, as each defined below.

The NPI values may include a value that identifies a distribution of users over time, a value that identifies a PRB utilization rate of a coverage area over time (e.g., a coverage area associated with one or more existing cell sites), one or more throughput values associated with the coverage area over time, and/or any other NPI values described elsewhere herein. The data that identifies the set of candidate locations for small cells may include geo-location data (e.g., latitudinal coordinates, longitudinal coordinates, and/or the like) for specific structures that are identified as viable locations for a small cell site (e.g., an office building, a gas station, a traffic light, a street lamp, and/or the like). In some cases, the network planning platform may determine a distance from an existing cell site (e.g., a macro tower, etc.) to one or more of the set of candidate locations for the small cell sites. The geo-location data for the existing cell sites may include latitudinal coordinates, longitudinal coordinates, and/or the like. The data that identifies the set of competitor cell sites within the coverage area may include geo-location data for a competitor cell site, data that identifies a type of cell site, and/or the like.

In some implementations, the network planning platform may analyze the data described above to determine optimal deployment locations for one or more small cell sites. For example, the network planning platform may provide the data described above as input to a data model that has been trained using machine learning, which may analyze the data and may output, for one or more of the set of candidate locations for small cell sites, values that indicate likelihoods of the candidate locations being an optimal location.

In some cases, the network planning platform may determine whether the NPI values satisfy corresponding threshold network performance values (e.g., that may be associated with industry standards, organization standards, and/or the like, as described elsewhere herein. For example, the network planning platform may determine, for a given interval of time (e.g., six months, a year, etc.), a utilization rate of users within the coverage area. Furthermore, the network planning platform may determine whether the utilization rate is between a upper bound NPI value and a lower bound NPI value. If the utilization rate is between upper bound NPI value and the lower bound NPI value, the network planning platform may determine that a particular candidate location is to be selected as a location for deployment of a small cell site.

In some implementations, the network planning platform may analyze the data described above to determine an optimal resource allocation for one or more small cell sites. For example, a small cell site may be within a coverage area of a macro cell site. In this case, the network planning platform may determine that a particular time period is a peak usage time period, and that within the coverage area, a specific geographic area within the coverage area is using a threshold amount of available data. Additionally, the network planning platform may assign or reassign resources to the small cell site based on determining that the particular time period is the peak usage time period and based on the specific geographic area.

In some implementations, the network planning platform may determine a predicted return on investment (ROI) value for deploying of a small cell site. For example, the network planning platform may determine a predicted ROI value for one or more of the set of candidate locations for deployment of small cells. In this case, the network planning platform may determine the predicted ROI value by determining predicted revenue based on customer church values within the coverage area, sales data for premium data services within the coverage area, a net promoter score (NPS) associated with the coverage area, a customer satisfaction score (CSAT) associated with the coverage area, and/or the like. In some cases, the network planning platform may use the predicted ROI value as part of determining whether to include a recommendation to deploy a new small cell site as part of the plan. For example, the network planning platform may compare the predicted ROI value to a threshold ROI value to determine whether to include the recommendation in the plan.

As shown by reference number 160, the network planning platform may perform one or more actions to cause the plan to be implemented. For example, as shown by reference number 160-1, the network planning platform may provide the plan to the client device. In this case, the network planning platform may provide the plan to the client device using a communication interface, such as an application programming interface (API) or a similar type of interface.

As shown by reference number 165-1, the client device may display the plan. For example, the client device may display the plan to allow a user, such as an agent or employee of the telecommunicator provider, to view the plan via the interface. As shown by reference number 170-1, the client device may perform one or more actions to implement the plan. For example, the client device may create and/or approve an order to purchase and install the network technologies being upgraded, may provide the cell site, or another device near the cell site, with instructions that indicate how to prepare for the upgrade, and/or the like. In some cases, the user may, upon viewing the plan via the interface, approve the plan, reject the plan, modify the plan, conditionally approve the plan, and/or the like.

As shown by reference number 160-2, the network planning platform may submit a purchasing agreement to purchase hardware equipment and/or a software element that is part of the network technology that is being upgraded. For example, the network planning platform may analyze client information of the telecommunication provider to identify values that may be used to populate one or more fields of an electronic purchasing agreement. In this case, if the telecommunication provider has previously consented to automatic implementation of the upgrade, then the network planning platform may submit the purchasing agreement to complete a purchasing transaction. In some cases, the network planning platform may first obtain approval from an employee or agent of the telecommunication provider. In other cases, the network planning platform may populate some fields in the electronic purchasing agreement and may provide a partially filled-in electronic purchasing agreement to the client device. This may allow the client device to input certain types of information (e.g., sensitive information, personal information, financial information, etc.).

As shown by reference number 160-3, the network planning platform may generate and provide instructions that indicate how to prepare for an upgrade to the cell site. For example, the network planning platform may generate instructions that, for example, indicate how to disassemble a particular hardware component, how to install or upgrade a particular software element, and/or the like. In this case, the network planning platform may use a communication interface (e.g., an application programming interface (API), etc.) to provide the instructions to the cell site to allow a device associated with the cell site to use the instructions to automatically implement the upgrade, to allow a human to read the instructions to implement the upgrade, and/or the like. In some cases, such as when upgrade is a particular software element, the network planning platform may be able to orchestrate automatically installing or updating the particular software element (e.g., by downloading an executable and causing the executable to be launched at a device associated with the cell site).

In some implementations, the network planning platform may cause one or more upgrades to be implemented without generating a plan. For example, the network planning platform may, based on an analysis of the particular NPI values and the overall site score (or the set of overall site scores), perform one or more actions (such as action(s) described above) that cause an upgrade to be implemented at the cell site (or at one or more of the group of cell sites).

In this way, the network planning platform generates an overall site score that is used to determine whether to upgrade the cell site. By upgrading the cell site (e.g., to a cell site that supports 5G network technologies), the network planning platform improves overall service in the coverage area, thereby reducing latency rates, increasing available bandwidth and throughput, improving quality of service, all while allowing for a more efficient and effective allocation of resources.

As indicated above, FIGS. 1A-1E are provided merely as one or more examples. Other examples may differ from what is described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) of example implementation(s) 100 may perform one or more functions described as being performed by another set of devices of example implementation(s) 100.

Figure 2:
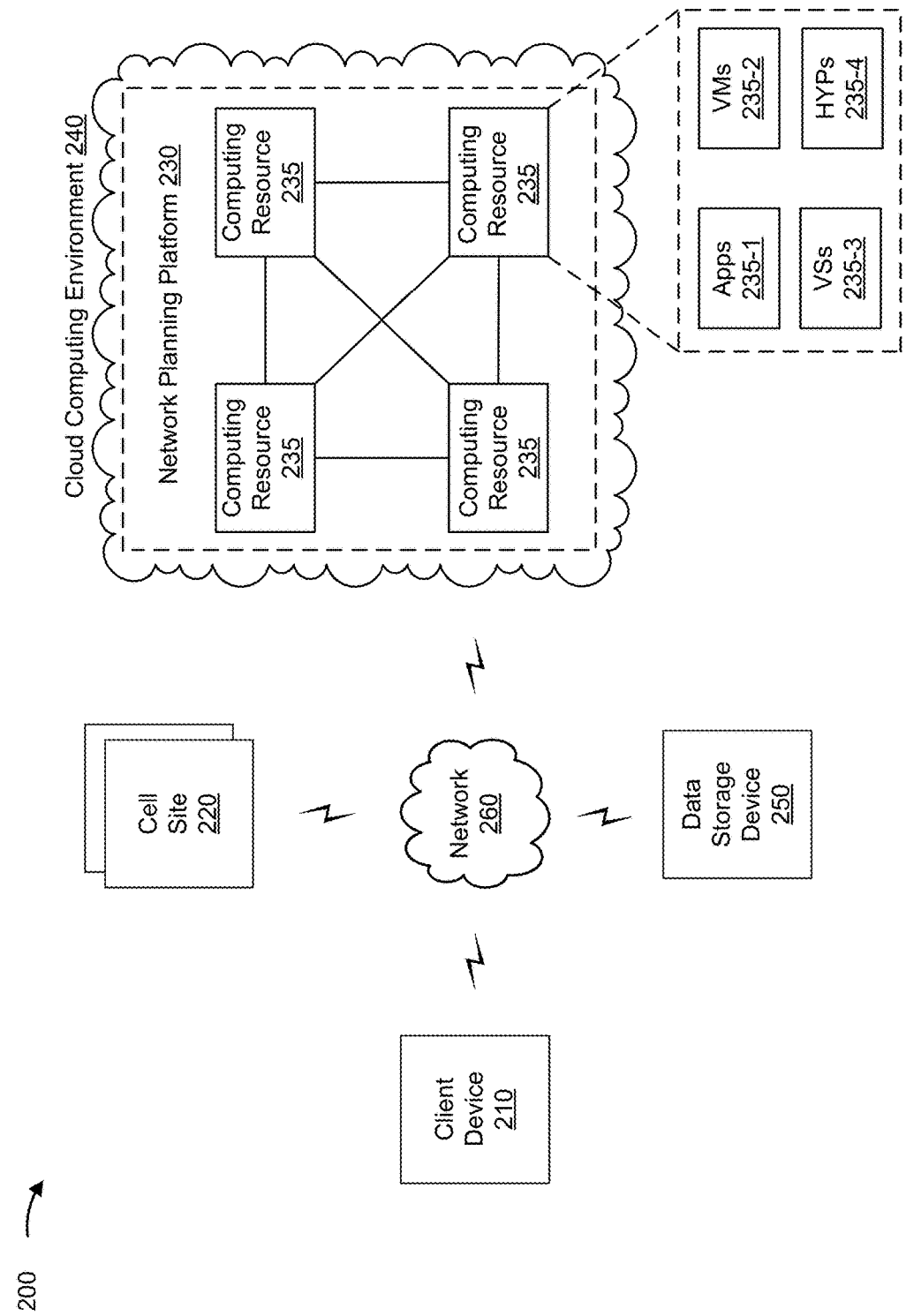
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, one or more cell sites 220, a network planning platform 230 hosted within a cloud computing environment 240, a data storage device 250, and/or a network 260. Devices of environment 200 may interconnect via wired connections, wireless connections, or a combination of wired and wireless connections.

Client device 210 includes one or more devices capable of receiving, generating, storing, processing, and/or providing information associated with a plan to upgrade one or more cell sites. For example, client device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, client device 210 may provide, to network planning platform 230, a request for one or more overall site scores for one or more cell sites. In some implementations, client device 210 may receive a plan to upgrade one or more network technologies from network planning platform 230. In some implementations, client device 210 may perform one or more actions with one or more other devices to cause the plan to be implemented.

Cell site 220 includes one or more devices capable of communicating with user devices using a cellular Radio Access Technology (RAT). For example, cell site 220 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Cell site 220 may transfer traffic between user devices (e.g., using a cellular RAT), other cell sites 220 (e.g., using a wireless interface or a backhaul interface, such as a wired backhaul interface), and/or network 260. Cell site 220 may provide one or more cells that cover geographic areas. Some cell sites 220 may be mobile cell sites 220. Some cell sites 220 may be capable of communicating using multiple RATs.

In some implementations, cell site 220 may perform scheduling and/or resource management for the user devices covered by cell site 220 (e.g., user devices covered by a cell provided by cell site 20). In some implementations, cell site 220 may be controlled or coordinated by a network controller, which may perform load balancing, network-level configuration, and/or the like. The network controller may communicate with cell sites 220 via a wireless or wireline backhaul. In some implementations, cell site 220 may include a network controller, a self-organizing network (SON) module or component, or a similar module or component. In other words, a cell site 220 may perform network control, scheduling, and/or network planning functions (e.g., for other cell sites 220 and/or for uplink, downlink, and/or side link communications of user devices covered by the cell site 220). In some implementations, cell site 220 may include a central unit and multiple distributed units. The central unit may coordinate access control and communication with regard to the multiple distributed units. The multiple distributed units may provide user devices and/or other cell sites 220 with access to network 260.

In some implementations, cell site 220 may be configured with one or more hardware components and/or one or more software elements needed to support fifth generation (5G) network technologies. In some implementations, cell site 220 may receive, from client device 210 or network planning platform 230, instructions that indicate how to install and/or deploy a hardware component and/or a software element that is needed to support 5G network technologies. In some implementations, cell site 220 may receive, from client device 210 or network planning platform 230, instructions that indicate how to upgrade a first 3G or 4G hardware component or software element to a second 3G or 4G hardware component or software element.

Network planning platform 230 includes one or more devices capable of receiving, storing, generating, determining, and/or providing information associated with a plan to upgrade one or more cell sites. For example, network planning platform 230 may include a server device (e.g., a host server, a web server, an application server, etc.), a data center device, or a similar device. In some implementations, network planning platform 230 may support an application or website that client device 210 uses to submit requests for generating plans. In some implementations, network planning platform 230 may generate one or more overall site scores for one or more cell sites. In some implementations, network planning platform 230 may generate a plan, and may perform one or more actions to implement the plan, as described elsewhere herein.

In some implementations, as shown, network planning platform 230 may be hosted in cloud computing environment 240. While implementations described herein describe network planning platform 230 as being hosted in cloud computing environment 240, in some implementations, network planning platform 230 might not be cloud-based (i.e., may be implemented outside of a cloud computing environment) or may be partially cloud-based.

Cloud computing environment 240 includes an environment that hosts network planning platform 230. Cloud computing environment 240 may provide computation, software, data access, storage, etc. services that do not require end-user knowledge of a physical location and configuration of system(s) and/or device(s) that hosts network planning platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host network planning platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by client device 210, cell site 220, and/or data storage device 250. Application 235-1 may eliminate a need to install and execute the software applications on these devices. For example, application 235-1 may include software associated with network planning platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., client device 210, cell site 220, and/or data storage device 250, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Data storage device 250 includes one or more devices capable of receiving, storing, generating, determining, and/or providing information associated with a set of network performance indicator (NPI) values and/or other data associated with a telecommunication provider. For example, data storage device 250 may include a server device or a group of server devices. In some implementations, data storage device 250 may store data for a telecommunication provider. In some implementations, data storage device 250 may provide the data to network planning platform 230 (e.g., a set of NPI values, a set of threshold network performance values, and/or any other types of data described elsewhere herein).

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
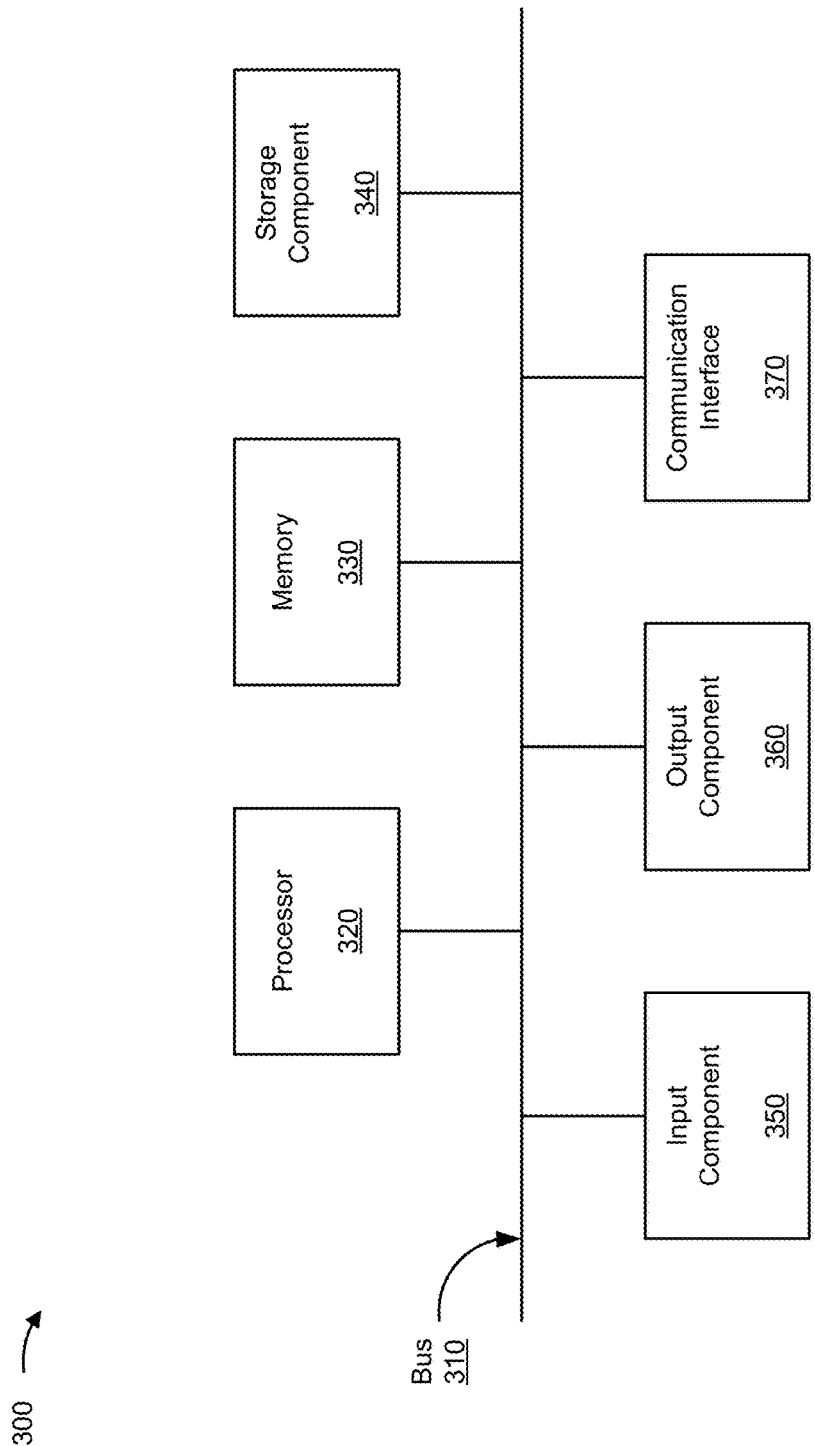
FIG. 3 is a diagram of example components of one or more devices of FIG. 2.

FIG. 3 is a diagram of example components of a device 300. Device 300 may correspond to client device 210, one or more cell sites 220, network planning platform 230, and/or data storage device 250. In some implementations, client device 210, one or more cell sites 220, network planning platform 230, and/or data storage device 250 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
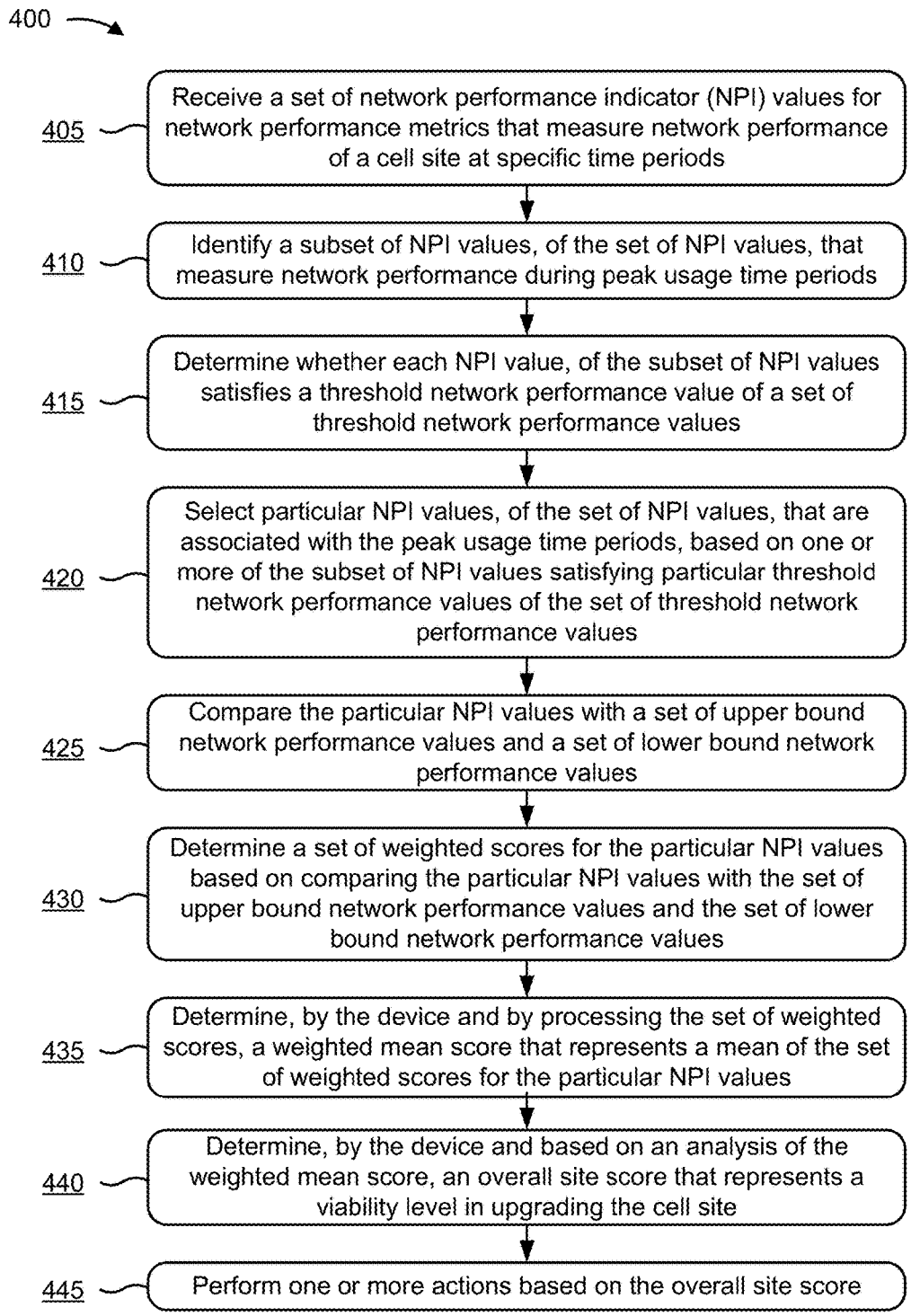
FIGS. 4-6 are flow charts of an example process for generating an overall site score for a cell site and, based on the overall site score, performing one or more actions to cause the cell site to be upgraded.

FIG. 4 is a flow chart of an example process 400 for generating an overall site score for a cell site and, based on the overall site score, performing one or more actions to cause the cell site to be upgraded. In some implementations, one or more process blocks of FIG. 4 may be performed by a network planning platform (e.g., network planning platform 230). In some implementations, one or more process blocks of FIG. 4 may be performed by another device or a group of devices separate from or including the network planning platform, such as a client device (e.g., client device 210), a cell site (e.g., cell site 220), and/or the like.

As shown in FIG. 4, process 400 may include receiving a set of network performance indicator (NPI) values for network performance metrics that measure network performance of a cell site at specific time periods (block 405). For example, the network planning platform (e.g., using computing resource 235, processor 320, memory 330, storage component 340, input component 350, communication interface 370, and/or the like) may receive a set of network performance indicator (NPI) values for network performance metrics that measure network performance of a cell site at specific time periods, as described above.

As further shown in FIG. 4, process 400 may include identifying a subset of NPI values, of the set of NPI values, that measure network performance during peak usage time periods (block 410). For example, the network planning platform (e.g., using computing resource 235, processor 320, memory 330, storage component 340, and/or the like) may identify a subset of NPI values, of the set of NPI values, that measure network performance during peak usage time periods, as described above.

As further shown in FIG. 4, process 400 may include determining whether each NPI value, of the subset of NPI values satisfies a threshold network performance value, of a set of threshold network performance values (block 415). For example, the network planning platform (e.g., using computing resource 235, processor 320, memory 330, storage component 340, and/or the like) may determine whether each NPI value, of the subset of NPI values, satisfies a threshold network performance value, of a set of threshold network performance values, as described above.

As further shown in FIG. 4, process 400 may include selecting particular NPI values, of the set of NPI values, that are associated with the peak usage time periods, based on one or more of the subset of NPI values satisfying particular threshold network performance values of the set of threshold network performance values (block 420). For example, the network planning platform (e.g., using computing resource 235, processor 320, memory 330, storage component 340, and/or the like) may select particular NPI values, of the set of NPI values, that are associated with the peak usage time periods, based on one or more of the subset of NPI values satisfying particular threshold network performance values of the set of threshold network performance values, as described above.

As further shown in FIG. 4, process 400 may include comparing the particular NPI values with a set of upper bound network performance values and a set of lower bound network performance values (block 425). For example, the network planning platform (e.g., using computing resource 235, processor 320, memory 330, storage component 340, and/or the like) may compare the particular NPI values with a set of upper bound network performance values and a set of lower bound network performance values, as described above.

As further shown in FIG. 4, process 400 may include determining a set of weighted scores for the particular NPI values based on comparing the particular NPI values with the set of upper bound network performance values and the set of lower bound network performance values (block 430). For example, the network planning platform (e.g., using computing resource 235, processor 320, memory 330, storage component 340, and/or the like) may determine a set of weighted scores for the particular NPI values based on comparing the particular NPI values with the set of upper bound network performance values and the set of lower bound network performance values, as described above.

As further shown in FIG. 4, process 400 may include determining, by processing the set of weighted scores, a weighted mean score that represents a mean of the set of weighted scores for the particular NPI values (block 435). For example, the network planning platform (e.g., using computing resource 235, processor 320, memory 330, storage component 340, and/or the like) may determine, by processing the set of weighted scores, a weighted mean score that represents a mean of the set of weighted scores for the particular NPI values, as described above.

As further shown in FIG. 4, process 400 may include determining, based on an analysis of the weighted mean score, an overall site score that represents a viability level in upgrading the cell site (block 440). For example, the network planning platform (e.g., using computing resource 235, processor 320, memory 330, storage component 340, and/or the like) may determine, based on an analysis of the weighted mean score, an overall site score that represents a viability level in upgrading the cell site, as described above.

As further shown in FIG. 4, process 400 may include performing one or more actions based on the overall site score (block 445). For example, the network planning platform (e.g., using computing resource 235, processor 320, memory 330, storage component 340, input component 350, output component 360, communication interface 370, and/or the like) may perform one or more actions based on the overall site score, as described above.

Process 400 may include additional implementations, such as any single implementation or any combination of implementations described below and/or in connection with one or more other processes described elsewhere herein.

In some implementations, the cell site may support third generation (3G) network technology or fourth generation (4G) network technology, and, when generating the plan, the network planning platform may generate, as the plan, a particular plan to upgrade the network technology supported by the cell site from 3G network technology or 4G network technology to fifth generation (5G) network technology, where the plan specifies a manner in which to carry out the upgrade.

In some implementations, when determining the set of weighted scores for the particular NPI values, the network planning platform may determine that an NPI value, of the particular NPI values, is between a upper bound network performance value, of the set of upper bound network performance values, and a corresponding lower bound network performance value of the set of lower bound network performance values. Additionally, the network planning platform may determine a weighted value for the NPI, of a set of weighted values, based on a degree to which the NPI value is between the upper bound network performance value and the corresponding lower bound network performance value. Additionally, the network planning platform may determine a weighted score, of the set of weighted scores, based on the NPI value and the weighted value.

In some implementations, the network performance metrics may include at least one of: one or more metrics that measure volume of traffic, one or more utilization rate metrics associated with the cell site, one or more quality of service (QoS) metrics associated with the cell site, one or more throughput metrics associated with the cell site, one or more metrics that measure user activity, or one or more latency metrics associated with the cell site.

In some implementations, when determining the overall site score, the network planning platform may provide, as input to a data model, the particular NPI values and the weighted mean score to cause the data model to determine a predicted overall site score that is to be used as the overall site score, where the data model generates the predicted overall site score by generating a predicted set of NPI values for the cell site for a future time period, generating a new set of weighted scores for the predicted set of NPI values, generating a new weighted mean score that represents a mean of the new set of weighted scores, and determining the predicted overall site score based on the analysis of the predicted set of NPI values and the new weighted mean score.

In some implementations, the network planning platform may receive, before determining the overall site score, data that identifies a list of site equipment for the cell site, and may determine, by processing the data that identifies the list of site equipment, a predicted cost of upgrading the cell site, where determining the overall site score includes determining the overall site score based on: the particular NPI values, data that identifies the weighted mean score, and data that identifies the predicted cost of upgrading the cell site.

In some implementations, the network planning platform may generate, based on the overall site score, a plan to upgrade one or more network technologies associated with the cell site. In some implementations, the network planning platform may cause, after generating the plan, the one or more network technologies associated with the cell site to be upgraded.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
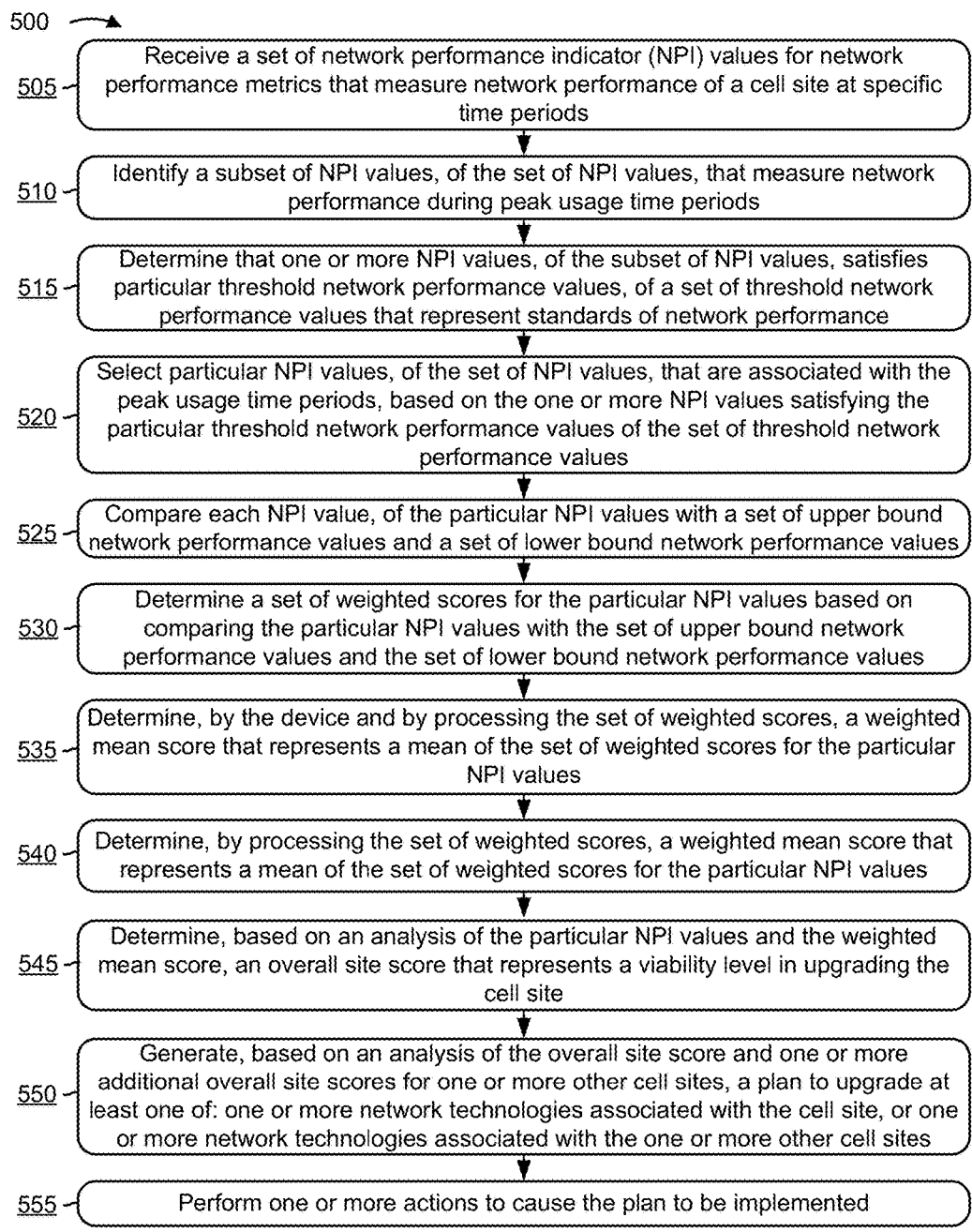

FIG. 5 is a flow chart of an example process 500 for generating an overall site score for a cell site and, based on the overall site score, performing one or more actions to cause the cell site to be upgraded. In some implementations, one or more process blocks of FIG. 5 may be performed by a network planning platform (e.g., network planning platform 230). In some implementations, one or more process blocks of FIG. 5 may be performed by another device or a group of devices separate from or including the network planning platform, such as a client device (e.g., client device 210), a cell site (e.g., cell site 220), and/or the like.

As shown in FIG. 5, process 500 may include receiving a set of NPI values for network performance metrics that measure network performance of a cell site at specific time periods (block 505). For example, the network planning platform (e.g., using computing resource 235, processor 320, memory 330, storage component 340, input component 350, communication interface 370, and/or the like) may receive a set of NPI values for network performance metrics that measure network performance of a cell site at specific time periods, as described above.

As further shown in FIG. 5, process 500 may include identifying a subset of NPI values, of the set of NPI values, that measure network performance during peak usage time periods (block 510). For example, the network planning platform (e.g., using computing resource 235, processor 320, memory 330, storage component 340, and/or the like) may identify a subset of NPI values, of the set of NPI values, that measure network performance during peak usage time periods, as described above.

As further shown in FIG. 5, process 500 may include determining that one or more NPI values, of the subset of NPI values, satisfies particular threshold network performance values, of a set of threshold network performance values that represent standards of network performance (block 515). For example, the network planning platform (e.g., using computing resource 235, processor 320, memory 330, storage component 340, and/or the like) may determine that one or more NPI values, of the subset of NPI values, satisfies particular threshold network performance values, of a set of threshold network performance values that represent standards of network performance, as described above.

As further shown in FIG. 5, process 500 may include selecting particular NPI values, of the set of NPI values, that are associated with the peak usage time periods, based on the one or more NPI values satisfying the particular threshold network performance values of the set of threshold network performance values (block 520). For example, the network planning platform (e.g., using computing resource 235, processor 320, memory 330, storage component 340, and/or the like) may select particular NPI values, of the set of NPI values, that are associated with the peak usage time periods, based on the one or more NPI values satisfying the particular threshold network performance values of the set of threshold network performance values, as described above.

As further shown in FIG. 5, process 500 may include comparing each NPI value, of the particular NPI values, with a set of upper bound network performance values and a set of lower bound network performance values (block 525). For example, the network planning platform (e.g., using computing resource 235, processor 320, memory 330, storage component 340, and/or the like) may compare each NPI value, of the particular NPI values, with a set of upper bound network performance values and a set of lower bound network performance values, as described above.

As further shown in FIG. 5, process 500 may include determining a set of weighted scores for the particular NPI values based on comparing the particular NPI values with the set of upper bound network performance values and the set of lower bound network performance values (block 530). For example, the network planning platform (e.g., using computing resource 235, processor 320, memory 330, storage component 340, and/or the like) may determine a set of weighted scores for the particular NPI values based on comparing the particular NPI values with the set of upper bound network performance values and the set of lower bound network performance values, as described above.

As further shown in FIG. 5, process 500 may include determining, by processing the set of weighted scores, a weighted mean score that represents a mean of the set of weighted scores for the particular NPI values (block 535). For example, the network planning platform (e.g., using computing resource 235, processor 320, memory 330, storage component 340, and/or the like) may determine, by processing the set of weighted scores, a weighted mean score that represents a mean of the set of weighted scores for the particular NPI values, as described above.

As further shown in FIG. 5, process 500 may include determining, based on an analysis of the particular NPI values and the weighted mean score, an overall site score that represents a viability level in upgrading the cell site (block 540). For example, the network planning platform (e.g., using computing resource 235, processor 320, memory 330, storage component 340, and/or the like) may determine, based on an analysis of the particular NPI values and the weighted mean score, an overall site score that represents a viability level in upgrading the cell site, as described above.

As further shown in FIG. 5, process 500 may include generating, based on an analysis of the overall site score and one or more additional overall site scores for one or more other cell sites, a plan to upgrade at least one of: one or more network technologies associated with the cell site, or one or more network technologies associated with the one or more other cell sites (block 545). For example, the network planning platform (e.g., using computing resource 235, processor 320, memory 330, storage component 340, input component 350, output component 360, communication interface 370, and/or the like) may generate, based on an analysis of the overall site score and one or more additional overall site scores for one or more other cell sites, a plan to upgrade at least one of: one or more network technologies associated with the cell site, or one or more network technologies associated with the one or more other cell sites, as described above.

As further shown in FIG. 5, process 500 may include performing one or more actions to cause the plan to be implemented (block 550). For example, the network planning platform (e.g., using computing resource 235, processor 320, memory 330, storage component 340, input component 350, output component 360, communication interface 370, and/or the like) may perform one or more actions to cause the plan to be implemented, as described above.

Process 500 may include additional implementations, such as any single implementation or any combination of implementations described below and/or in connection with one or more other processes described elsewhere herein.

In some implementations, when determining the set of weighted scores for the particular NPI values, the network planning platform may determine that an NPI value, of the particular NPI values, is between a upper bound network performance value, of the set of upper bound network performance values, and a corresponding lower bound network performance value of the set of lower bound network performance values. Additionally, the network planning platform may determine a weighted value for the NPI, of a set of weighted values, based on a degree to which the NPI value is between the upper bound network performance value and the corresponding lower bound network performance value. Additionally, the network planning platform may determine a weighted score, of the set of weighted scores, based on the NPI value and the weighted value.

In some implementations, when determining the overall site score, the network planning platform may provide, as input to a data model, the particular NPI values and the weighted mean score to cause the data model to generate the overall site score, where the data model has been trained by using one or more machine learning techniques to analyze historical NPI values for a group of cell sites.

In some implementations, the network planning platform may determine, by analyzing a list of site equipment for the cell site, a predicted cost of upgrading the cell site, and, when determining the overall site score, may determine the overall site score based on: the particular NPI values, the weighted mean score, and data that identifies the predicted cost of upgrading the cell site, and, when generating the plan, may determine, as part of the plan, an order in which to upgrade the cell site and the one or more other cell sites, where the order is based on the predicted cost of upgrading the cell site and a predicted cost of upgrading the one or more other cell sites.

In some implementations, the network performance metrics may include at least one of: one or more metrics that measure volume of traffic, one or more utilization rate metrics associated with the cell site, one or more quality of service (QoS) metrics associated with the cell site, one or more throughput metrics associated with the cell site, one or more metrics that measure user activity, or one or more latency metrics associated with the cell site. In some implementations, the plan may include at least one of: a first set of instructions that indicate what part of the cell site or a particular cell site, of the one or more other cell sites, to upgrade, a second set of instructions that indicate one or more times at which to upgrade the cell site or the particular cell site, or a third set of instructions that indicate how to upgrade the cell site or the particular cell site.

In some implementations, when performing the one or more actions, the network planning platform may determine that a first part of the plan satisfies a threshold confidence level and that a second part of the plan does not satisfy the threshold confidence level, and may generate, as the first part of the plan, a plan to implement one or more network technologies associated with the cell site, where the plan includes at least one of: a list of hardware components that are to be updated or replaced, or a list of software elements that are to be updated or replaced. Additionally, the network planning platform may provide, for display via an interface that is accessible to one or more other devices, data indicating that the first part of the plan is being implemented, and may provide data identifying the second part of the plan for display via the interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
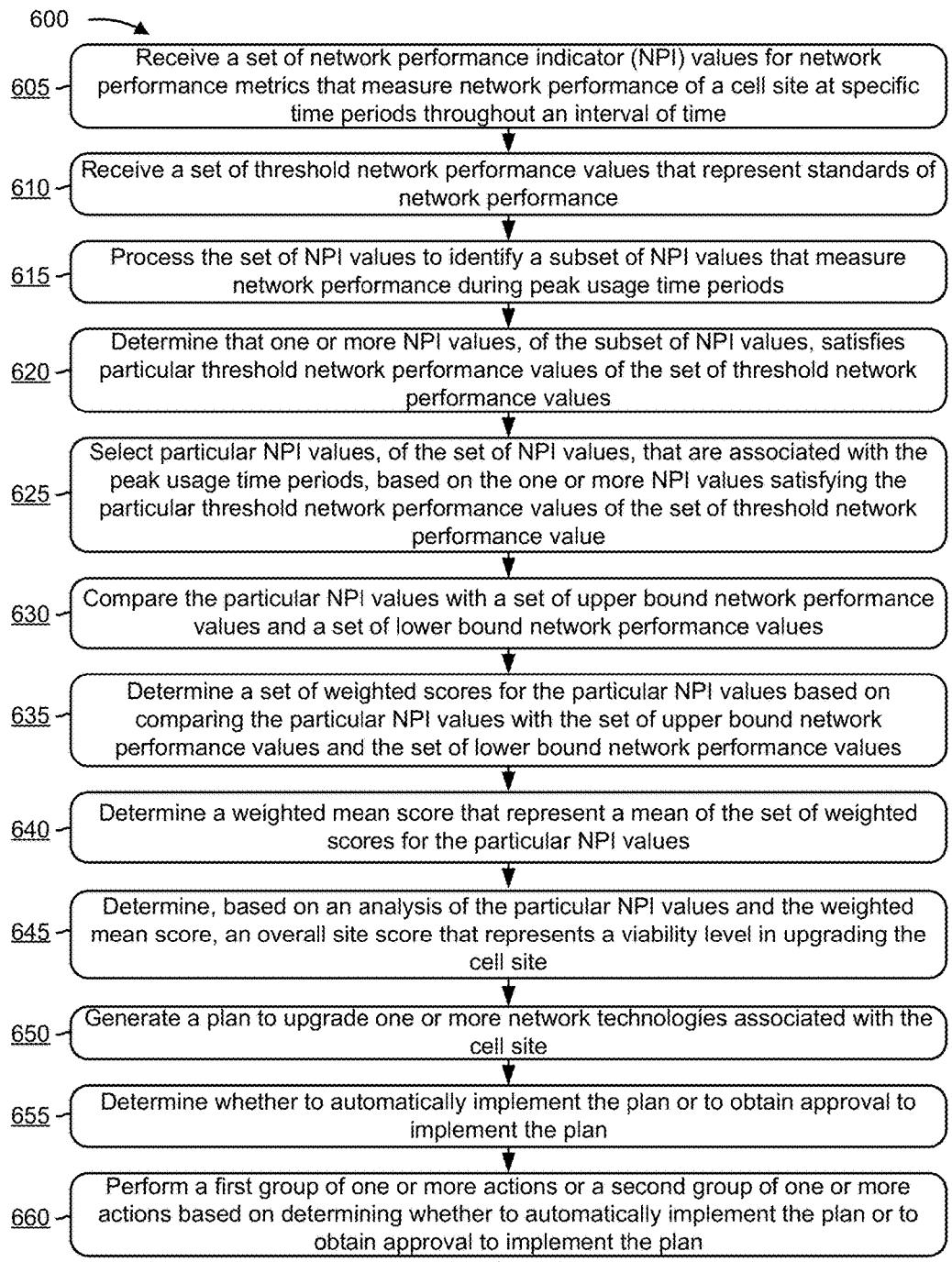

FIG. 6 is a flow chart of an example process 600 for generating an overall site score for a cell site and, based on the overall site score, performing one or more actions to cause the cell site to be upgraded. In some implementations, one or more process blocks of FIG. 6 may be performed by a network planning platform (e.g., network planning platform 230). In some implementations, one or more process blocks of FIG. 6 may be performed by another device or a group of devices separate from or including the network planning platform, such as a client device (e.g., client device 210), a cell site (e.g., cell site 220), and/or the like.

As shown in FIG. 6, process 600 may include receiving a set of network performance indicator (NPI) values for network performance metrics that measure network performance of a cell site at specific time periods throughout an interval of time (block 605). For example, the network planning platform (e.g., using computing resource 235, processor 320, memory 330, storage component 340, input component 350, communication interface 370, and/or the like) may receive a set of network performance indicator (NPI) values for network performance metrics that measure network performance of a cell site at specific time periods throughout an interval of time, as described above.

As further shown in FIG. 6, process 600 may include receiving a set of threshold network performance values that represent standards of network performance (block 610). For example, the network planning platform (e.g., using computing resource 235, processor 320, memory 330, storage component 340, input component 350, communication interface 370, and/or the like) may receive a set of threshold network performance values that represent standards of network performance, as described above.

As further shown in FIG. 6, process 600 may include processing the set of NPI values to identify a subset of NPI values that measure network performance during peak usage time periods (block 615). For example, the network planning platform (e.g., using computing resource 235, processor 320, memory 330, storage component 340, and/or the like) may process the set of NPI values to identify a subset of NPI values that measure network performance during peak usage time periods, as described above.

As further shown in FIG. 6, process 600 may include determining that one or more NPI values, of the subset of NPI values, satisfies particular threshold network performance values of the set of threshold network performance values (block 620). For example, the network planning platform (e.g., using computing resource 235, processor 320, memory 330, storage component 340, and/or the like) may determine that one or more NPI values, of the subset of NPI values, satisfies particular threshold network performance values of the set of threshold network performance values, as described above.

As further shown in FIG. 6, process 600 may include selecting particular NPI values, of the set of NPI values, that are associated with the peak usage time periods, based on the one or more NPI values satisfying the particular threshold network performance values of the set of threshold network performance values (block 625). For example, the network planning platform (e.g., using computing resource 235, processor 320, memory 330, storage component 340, and/or the like) may select particular NPI values, of the set of NPI values, that are associated with the peak usage time periods, based on the one or more NPI values satisfying the particular threshold network performance values of the set of threshold network performance values, as described above.

As further shown in FIG. 6, process 600 may include comparing the particular NPI values with a set of upper bound network performance values and a set of lower bound network performance values (block 630). For example, the network planning platform (e.g., using computing resource 235, processor 320, memory 330, storage component 340, and/or the like) may compare the particular NPI values with a set of upper bound network performance values and a set of lower bound network performance values, as described above.

As further shown in FIG. 6, process 600 may include determining a set of weighted scores for the particular NPI values based on comparing the particular NPI values with the set of upper bound network performance values and the set of lower bound network performance values (block 635). For example, the network planning platform (e.g., using computing resource 235, processor 320, memory 330, storage component 340, and/or the like) may determine a set of weighted scores for the particular NPI values based on comparing the particular NPI values with the set of upper bound network performance values and the set of lower bound network performance values, as described above.

As further shown in FIG. 6, process 600 may include determining, by processing the set of weighted scores, a weighted mean score that represents a mean of the set of weighted scores for the particular NPI values (block 640). For example, the network planning platform (e.g., using computing resource 235, processor 320, memory 330, storage component 340, and/or the like) may determine, by processing the set of weighted scores, a weighted mean score that represents a mean of the set of weighted scores for the particular NPI values, as described above.

As further shown in FIG. 6, process 600 may include determining, based on an analysis of the particular NPI values and the weighted mean score, an overall site score that represents a viability level in upgrading the cell site (block 645). For example, the network planning platform (e.g., using computing resource 235, processor 320, memory 330, storage component 340, and/or the like) may determine, based on an analysis of the particular NPI values and the weighted mean score, an overall site score that represents a viability level in upgrading the cell site, as described above.

As further shown in FIG. 6, process 600 may include generating, based on the overall site score, a plan to upgrade one or more network technologies associated with the cell site (block 650). For example, the network planning platform (e.g., using computing resource 235, processor 320, memory 330, storage component 340, input component 350, output component 360, communication interface 370, and/or the like) may generate, based on the overall site score, a plan to upgrade one or more network technologies associated with the cell site, as described above.

As further shown in FIG. 6, process 600 may include determining, based on whether the overall site score satisfies a threshold confidence level, whether to automatically implement the plan or to obtain approval to implement the plan (block 655). For example, the network planning platform (e.g., using computing resource 235, processor 320, memory 330, storage component 340, and/or the like) may determine, based on whether the overall site score satisfies a threshold confidence level, whether to automatically implement the plan or to obtain approval to implement the plan, as described above.

As further shown in FIG. 6, process 600 may include performing a first group of one or more actions or a second group of one or more actions based on determining whether to automatically implement the plan or to obtain approval to implement the plan (block 660). For example, the network planning platform (e.g., using computing resource 235, processor 320, memory 330, storage component 340, input component 350, output component 360, communication interface 370, and/or the like) may perform a first group of one or more actions or a second group of one or more actions based on determining whether to automatically implement the plan or to obtain approval to implement the plan, as described above.

Process 600 may include additional implementations, such as any single implementation or any combination of implementations described below and/or in connection with one or more other processes described elsewhere herein.

In some implementations, when determining the set of weighted scores for the particular NPI values, the network planning platform may determine that an NPI value, of the particular NPI values, is between a upper bound network performance value, of the set of upper bound network performance values, and a corresponding lower bound network performance value of the set of lower bound network performance values. Additionally, the network planning platform may determine a weighted value for the NPI, of a set of weighted values, based on a degree to which the NPI value is between the upper bound network performance value and the corresponding lower bound network performance value. Additionally, the network planning platform may determine a weighted score, of the set of weighted scores, based on the NPI value and the weighted value.

In some implementations, the network planning platform may receive, before determining the overall site score, data that identifies a list of site equipment for the cell site, and may determine, by processing the data that identifies the list of site equipment, a predicted cost of upgrading the cell site, and, when determining the overall site score, the network planning platform may determine the overall site score based on: the particular NPI values, data that identifies the weighted mean score, and data that identifies the predicted cost of upgrading the cell site.

In some implementations, when determining the overall site score, the network planning platform may provide, as input to a data model, the particular NPI values and the weighted mean score to cause the data model to determine a predicted overall site score that is to be used as the overall site score, and, when causing the data model to generate the predicted overall site score, the network planning platform may cause the data model to generate a predicted set of NPI values for the cell site for a future time period, generate a new set of weighted scores for the predicted set of NPI values, generate a new weighted mean score that represents a mean of the new set of weighted scores, and determine the predicted overall site score based on the analysis of the predicted set of NPI values and the weighted mean score.

In some implementations, when performing the first group of one or more actions or the second group of one or more actions, the network planning platform may populate, as part of the first group of one or more actions, one or more fields of an order form to purchase new site equipment that is being recommended for upgrading the cell site, and may provide the order form to a particular device associated with an organization that has deployed the cell site to permit the order form to be completed and submitted, where submitting the order form allows the new site equipment to be implemented at the cell site.

In some implementations, when performing the first group of one or more actions or the second group of one or more actions, the network planning platform may provide, as part of the second group of one or more actions, the plan to an interface accessible to another device to permit the other device to approve or modify the plan and to provide the one or more processors of the device with approval of the plan or with a modified plan.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a set of network performance indicator (NPI) values for network performance metrics that measure network performance of a cell site at specific time periods;
   identifying, by the device, a subset of NPI values, of the set of NPI values, that measure network performance during peak usage time periods;
   determining, by the device, whether each NPI value, of the subset of NPI values satisfies a threshold network performance value of a set of threshold network performance values;
   selecting, by the device, particular NPI values, of the set of NPI values, that are associated with the peak usage time periods, based on one or more of the subset of NPI values satisfying particular threshold network performance values of the set of threshold network performance values;
   comparing, by the device, the particular NPI values with a set of upper bound network performance values and a set of lower bound network performance values;
   determining, by the device, a set of weighted scores for the particular NPI values based on comparing the particular NPI values with the set of upper bound network performance values and the set of lower bound network performance values;
   determining, by the device and by processing the set of weighted scores, a weighted mean score that represents a mean of the set of weighted scores for the particular NPI values;
   determining, by the device and based on an analysis of the weighted mean score, an overall site score that represents a viability level in upgrading the cell site; and
   performing, by the device, one or more actions based on the overall site score.

2. The method of claim 1, wherein the cell site supports third generation (3G) network technology or fourth generation (4G) network technology; and
   further comprising:
      generating, based on the overall site score, a plan to upgrade the one or more network technologies supported by the cell site from 3G network technology or 4G network technology to fifth generation (5G) network technology,
         wherein the plan specifies a manner in which to implement the plan.

3. The method of claim 1, wherein determining the set of weighted scores for the particular NPI values comprises:
   determining that an NPI value, of the particular NPI values, is between a upper bound network performance value, of the set of upper bound network performance values, and a corresponding lower bound network performance value of the set of lower bound network performance values,
   determine a weighted value for the NPI, of a set of weighted values, based on a degree to which the NPI value is between the upper bound network performance value and the corresponding lower bound network performance value, and
   determine a weighted score, of the set of weighted scores, based on the NPI value and the weighted value.

4. The method of claim 1, wherein the network performance metrics include at least one of:
   one or more metrics that measure volume of traffic,
   one or more utilization rate metrics associated with the cell site,
   one or more quality of service (QoS) metrics associated with the cell site,
   one or more throughput metrics associated with the cell site,
   one or more metrics that measure user activity, or
   one or more latency metrics associated with the cell site.

5. The method of claim 1, wherein determining the overall site score comprises:
   providing, as input to a data model, the particular NPI values and the weighted mean score to cause the data model to determine a predicted overall site score that is to be used as the overall site score,
      wherein the data model generates the predicted overall site score by:
         generating a predicted set of NPI values for the cell site for a future time period,
         generating a new set of weighted scores for the predicted set of NPI values,
         generating a new weighted mean score that represents a mean of the new set of weighted scores, and
         determining the predicted overall site score based on the analysis of the predicted set of NPI values and the new weighted mean score.

6. The method of claim 1, further comprising:
   receiving, before determining the overall site score, data that identifies a list of site equipment for the cell site;
   determining, by processing the data that identifies the list of site equipment, a predicted cost of upgrading the cell site; and
   wherein determining the overall site score comprises:
      determining the overall site score based on:
         the particular NPI values,
         data that identifies the weighted mean score, and
         data that identifies the predicted cost of upgrading the cell site.

7. The method of claim 1, further comprising:
   generating, based on the overall site score, a plan to upgrade one or more network technologies associated with the cell site; and
   causing, after generating the plan, the one or more network technologies associated with the cell site to be upgraded.

8. A device, comprising:
   one or more memories; and
   one or more processors, operatively coupled to the one or more memories, to:
      receive a set of network performance indicator (NPI) values for network performance metrics that measure network performance of a cell site at specific time periods;
      identify a subset of NPI values, of the set of NPI values, that measure network performance during peak usage time periods;
      determine that one or more NPI values, of the subset of NPI values, satisfies particular threshold network performance values, of a set of threshold network performance values that represent standards of network performance;

select particular NPI values, of the set of NPI values, that are associated with the peak usage time periods, based on the one or more NPI values satisfying the particular threshold network performance values of the set of threshold network performance values;
compare each NPI value, of the particular NPI values with a set of upper bound network performance values and a set of lower bound network performance values;
determine a set of weighted scores for the particular NPI values based on comparing the particular NPI values with the set of upper bound network performance values and the set of lower bound network performance values;
determine, by processing the set of weighted scores, a weighted mean score that represents a mean of the set of weighted scores for the particular NPI values;
determine, based on an analysis of the particular NPI values and the weighted mean score, an overall site score that represents a viability level in upgrading the cell site;
generate, based on an analysis of the overall site score and one or more additional overall site scores for one or more other cell sites, a plan to upgrade at least one of:
one or more network technologies associated with the cell site, or
one or more network technologies associated with the one or more other cell sites; and
perform one or more actions to cause the plan to be implemented.

9. The device of claim 8, wherein the one or more processors, when determining the set of weighted scores for the particular NPI values, are to:
determine that an NPI value, of the particular NPI values, is between a upper bound network performance value, of the set of upper bound network performance values, and a corresponding lower bound network performance value of the set of lower bound network performance values, and
determine a weighted value for the NPI, of a set of weighted values, based on a degree to which the NPI value is between the upper bound network performance value and the corresponding lower bound network performance value, and
determine a weighted score, of the set of weighted scores, based on the NPI value and the weighted value.

10. The device of claim 8, wherein the one or more processors, when determining the overall site score, are to:
provide, as input to a data model, at least one of the particular NPI values and the weighted mean score to cause the data model to generate the overall site score, wherein the data model has been trained by using one or more machine learning techniques to analyze historical NPI values for a group of cell sites.

11. The device of claim 8, wherein the one or more processors are further to:
determine, by analyzing a list of site equipment for the cell site, a predicted cost of upgrading the cell site;
wherein the one or more processors, when determining the overall site score, are to:
determine the overall site score based on:
the particular NPI values,
the weighted mean score, and
data that identifies the predicted cost of upgrading the cell site; and wherein the one or more processors, when generating the plan, are to:
determine, as part of the plan, an order in which to upgrade the cell site and the one or more other cell sites,
wherein the order is based on the predicted cost of upgrading the cell site and a predicted cost of upgrading the one or more other cell sites.

12. The device of claim 8, wherein the network performance metrics include at least one of:
one or more metrics that measure volume of traffic,
one or more utilization rate metrics associated with the cell site,
one or more quality of service (QoS) metrics associated with the cell site,
one or more throughput metrics associated with the cell site,
one or more metrics that measure user activity, or
one or more latency metrics associated with the cell site.

13. The device of claim 8, wherein the plan includes at least one of:
a first set of instructions that indicate what part of the cell site or a particular cell site, of the one or more other cell sites, to upgrade,
a second set of instructions that indicate one or more times at which to upgrade the cell site or the particular cell site, or
a third set of instructions that indicate how to upgrade the cell site or the particular cell site.

14. The device of claim 8, wherein the one or more processors, when performing the one or more actions, are to:
determine that a first part of the plan satisfies a threshold confidence level and that a second part of the plan does not satisfy the threshold confidence level,
generate, as the first part of the plan, a plan to implement the one or more network technologies associated with the cell site,
wherein the plan includes at least one of:
a list of hardware components that are to be updated or replaced, or
a list of software elements that are to be updated or replaced,
provide, for display via an interface that is accessible to one or more other devices, data indicating that the first part of the plan is being implemented, and
provide data identifying the second part of the plan for display via the interface.

15. A non-transitory computer-readable medium storing instructions, the instructions comprising:
one or more instructions that, when executed by one or more processors of a device, cause the one or more processors to:
receive a set of network performance indicator (NPI) values for network performance metrics that measure network performance of a cell site at specific time periods throughout an interval of time;
receive a set of threshold network performance values that represent standards of network performance;
process the set of NPI values to identify a subset of NPI values that measure network performance during peak usage time periods;
determine that one or more NPI values, of the subset of NPI values, satisfies particular threshold network performance values of the set of threshold network performance values;
select particular NPI values, of the set of NPI values, that are associated with the peak usage time periods, based on the one or more NPI values satisfying the particular threshold network performance values of the set of threshold network performance value;
compare the particular NPI values with a set of upper bound network performance values and a set of lower bound network performance values;
determine a set of weighted scores for the particular NPI values based on comparing the particular NPI values with the set of upper bound network performance values and the set of lower bound network performance values;
determine, by processing the set of weighted scores, a weighted mean score that represent a mean of the set of weighted scores for the particular NPI values;
determine, based on an analysis of the particular NPI values and the weighted mean score, an overall site score that represents a viability level in upgrading the cell site;
generate, based on the overall site score, a plan to upgrade one or more network technologies associated with the cell site;
determine, based on whether the overall site score satisfies a threshold confidence level, whether to automatically implement the plan or to obtain approval to implement the plan; and
perform a first group of one or more actions or a second group of one or more actions based on determining whether to automatically implement the plan or to obtain approval to implement the plan.

16. The non-transitory computer-readable medium of claim 15, wherein the one or more instructions, that cause the one or more processors to determine the set of weighted scores for the particular NPI values, cause the one or more processors to:
determine that an NPI value, of the particular NPI values, is between a upper bound network performance value, of the set of upper bound network performance values, and a corresponding lower bound network performance value of the set of lower bound network performance values,
determine a weighted value for the NPI, of a set of weighted values, based on a degree to which the NPI value is between the upper bound network performance value and the corresponding lower bound network performance value, and
determine a weighted score, of the set of weighted scores, based on the NPI value and the weighted value.

17. The non-transitory computer-readable medium of claim 15, wherein the one or more instructions, when executed by the one or more processors, further cause the one or more processors to:
receive, before determining the overall site score, data that identifies a list of site equipment for the cell site;
determine, by processing the data that identifies the list of site equipment, a predicted cost of upgrading the cell site; and wherein the one or more instructions, that cause the one or more processors to determine the overall site score, cause the one or more processors to:
determine the overall site score based on:
the particular NPI values,
data that identifies the weighted mean scores, and
data that identifies the predicted cost of upgrading the cell site.

18. The non-transitory computer-readable medium of claim 15, wherein the one or more instructions, that cause the one or more processors to determine the overall site score, cause the one or more processors to:
provide, as input to a data model, the particular NPI values and the weighted mean score to cause the data model to determine a predicted overall site score that is to be used as the overall site score,
wherein the one or more instructions, that cause the data model to generate the predicted overall site score, cause the data model to:
generate a predicted set of NPI values for the cell site for a future time period,
generate a new set of weighted scores for the predicted set of NPI values,
generate a new weighted mean score that represent a mean of the new set of weighted scores, and
determine the predicted overall site score based on the analysis of the predicted set of NPI values and the new weighted mean score.

19. The non-transitory computer-readable medium of claim 15, wherein the one or more instructions, that cause the one or more processors to perform the first group of one or more actions or the second group of one or more actions, cause the one or more processors to:
populate, as part of the first group of one or more actions, one or more fields of an order form to purchase new site equipment that is being recommended for upgrading the cell site, and
provide the order form to a particular device associated with an organization that has deployed the cell site to permit the order form to be completed and submitted, wherein submitting the order form allows the new site equipment to be implemented at the cell site.

20. The non-transitory computer-readable medium of claim 15, wherein the one or more instructions, that cause the one or more processors to perform the first group of one or more actions or the second group of one or more actions, cause the one or more processors to:
provide, as part of the second group of one or more actions, the plan to an interface accessible to another device to permit the other device to approve or modify the plan and to provide the one or more processors of the device with approval of the plan or with a modified plan.

* * * * *